United States Patent
Oho et al.

(10) Patent No.: US 7,814,168 B2
(45) Date of Patent: Oct. 12, 2010

(54) UNIT-TO-UNIT DATA EXCHANGE SYSTEM, AND UNIT, EXCHANGE COMPLETION DATA KEEPING DEVICE AND PROGRAM FOR USE IN THE SAME

(75) Inventors: Masahiro Oho, Katano (JP); Akio Higashi, Takatsuki (JP); Mitsuhiro Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 1267 days.

(21) Appl. No.: 10/500,820

(22) PCT Filed: Oct. 29, 2003

(86) PCT No.: PCT/JP03/13810

§ 371 (c)(1),
(2), (4) Date: Jul. 7, 2004

(87) PCT Pub. No.: WO2004/004060

PCT Pub. Date: May 13, 2004

(65) Prior Publication Data

US 2005/0160117 A1     Jul. 21, 2005

(30) Foreign Application Priority Data

Oct. 30, 2002     (JP)     ............................. 2002-315703

(51) Int. Cl.
*G06F 15/16* (2006.01)
*G06F 17/30* (2006.01)

(52) U.S. Cl. ................................ 709/217; 707/999.204

(58) Field of Classification Search .................. 709/217; 707/999.204
See application file for complete search history.

(56) References Cited

U.S. PATENT DOCUMENTS 5,629,980 A *    5/1997    Stefik et al. ................... 705/54

(Continued)

FOREIGN PATENT DOCUMENTS

JP     2000-163488     6/2000

(Continued)

OTHER PUBLICATIONS

WinMX, [online], Frontcode Technologies, Oct. 19, 2002, [retrieved on Jan. 13, 2004], Retrieved from the Internet: <URL:http\\www.winmx.com/>.

(Continued)

*Primary Examiner*—George C Neurauter, Jr.
*Assistant Examiner*—Mark D Fearer
(74) *Attorney, Agent, or Firm*—Wenderoth, Lind & Ponack, L.L.P.

(57) ABSTRACT

A unit-to-unit data exchange system preventing an unfair exchange without increasing communications cost or a load on a server. A unit (11a) exchanges data with a unit (11b). An exchange completion data keeping device keeps exchange completion data that is necessary for each unit (11a and 11b) to reproduce the obtained data after the data exchange is completed. The exchange completion data keeping device transmits the exchange completion data obtained from the unit (11b) to the unit (11a) and transmits the exchange completion data obtained from the unit (11a) to the unit (11b) only when the unit (11a) and the unit (11b) have successfully received data of interest.

17 Claims, 27 Drawing Sheets

U.S. PATENT DOCUMENTS

| | | | | |
|---|---|---|---|---|
| 5,832,488 | A | * | 11/1998 | Eberhardt ................... 707/10 |
| 6,044,157 | A | * | 3/2000 | Uesaka et al. ............... 380/201 |
| 6,061,792 | A | | 5/2000 | Simon |
| 6,263,436 | B1 | * | 7/2001 | Franklin et al. ............. 713/167 |
| 7,181,017 | B1 | * | 2/2007 | Nagel et al. ................. 380/282 |
| 2003/0079222 | A1 | * | 4/2003 | Boykin et al. ................. 725/31 |

FOREIGN PATENT DOCUMENTS

| | | |
|---|---|---|
| JP | 2000-339851 | 12/2000 |
| JP | 2001-84177 | 3/2001 |
| JP | 2001-273133 | 10/2001 |
| JP | 2002-164881 | 6/2002 |
| JP | 2002-288453 | 10/2002 |
| JP | 2002-312523 | 10/2002 |

OTHER PUBLICATIONS

""Kami" Dake ga Taiho Sareru towa Kagiranai- ACCS ga Keizokuteki na Tekihatsu o Shisa", [online], Softbank ITmedia, Inc., Feb. 20, 2002, [retrieved on Jan. 13, 2004], Retrieved from the Internet: <URL:http\\www.itmedia.co.JP/news/0202/20accs.html>.

N. Asokan et al., "Asynchronous Protocols for Optimistic Fair Exchange", IBM Research Division, Zurich Researci Laboratory, Research Report RZ 2976 (#93022), Dec. 1997.

* cited by examiner

FIG. 3
| DATA ID | PUBLIC DATA ID | |
|---|---|---|
| DATA_ID-1111 | PUBLIC_DATA_ID-1111 | — D401 |
| DATA_ID-2222 | PUBLIC_DATA_ID-2222 | — D402 |
| ... | ... | |
FIG. 4
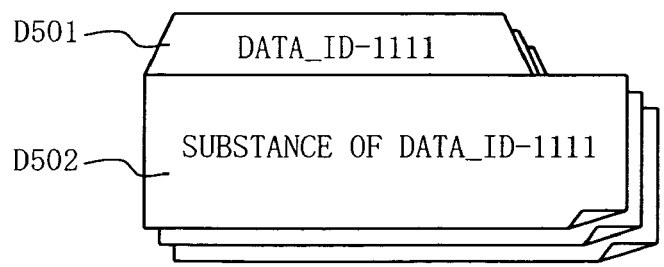
FIG. 5
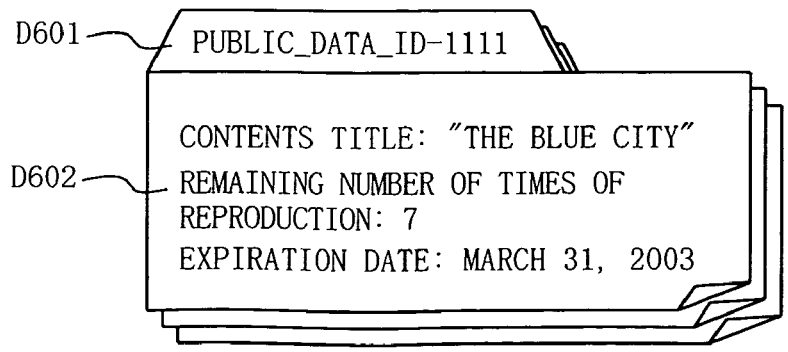

F I G. 1 1
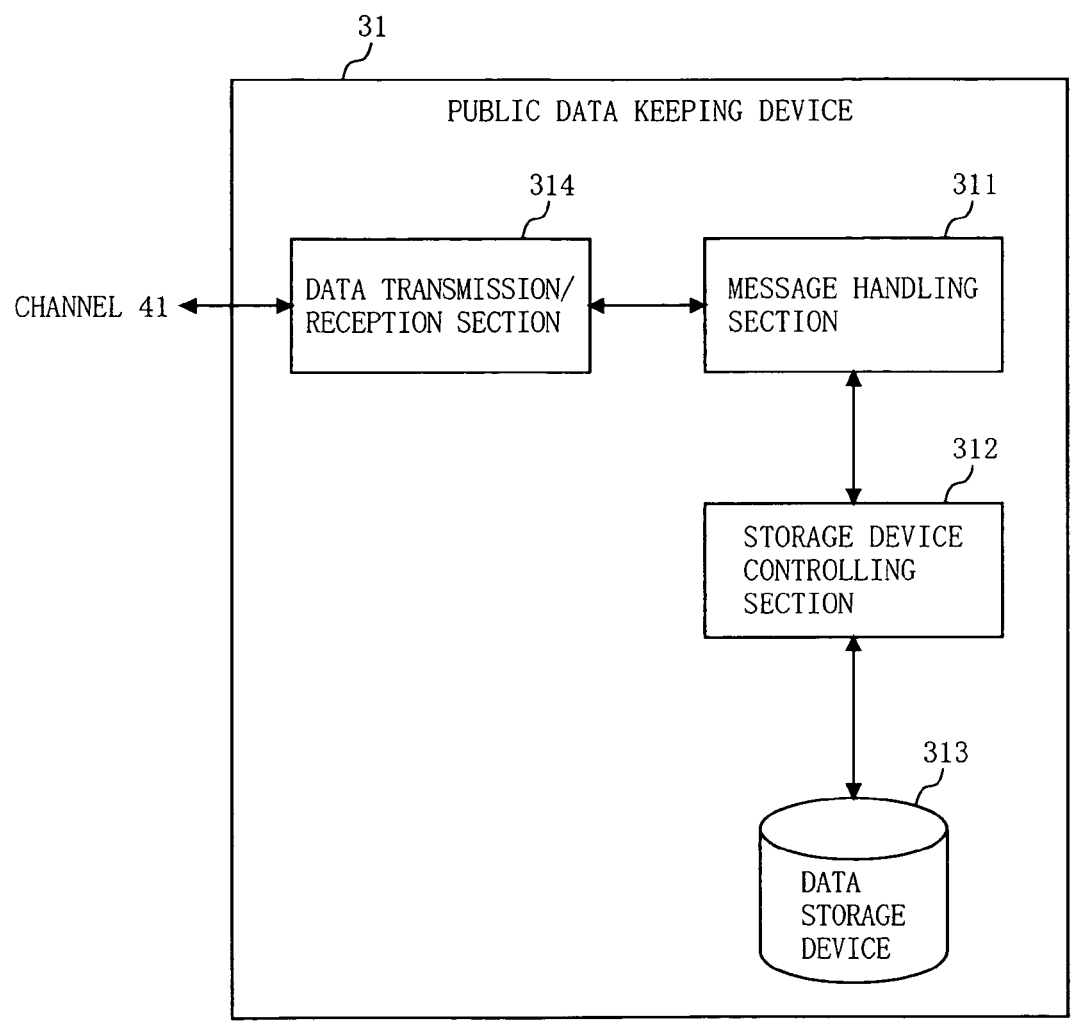

| REGISTERING UNIT ID | PUBLIC DATA ID |
|---|---|
| CLIENT_ID-1111 | PUBLIC_DATA_ID-1111 | ～D1201
| CLIENT_ID-2222 | PUBLIC_DATA_ID-2222 | ～D1202
| ... | ... |

F I G. 2 2
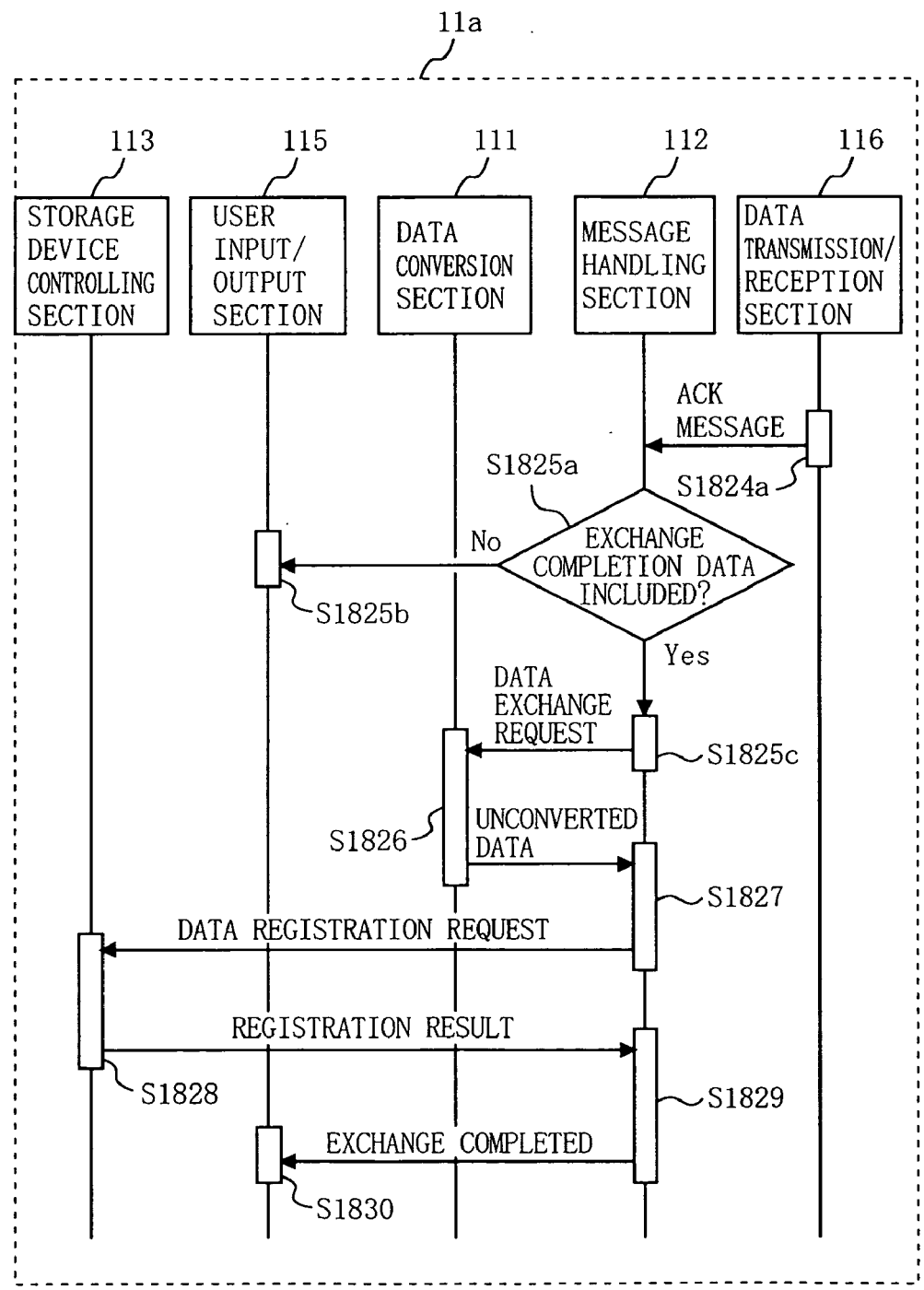

FIG. 29

| UNIT ID OF THE OTHER PARTY'S UNIT | NUMBER OF EXCHANGES | NUMBER OF SUCCESSFUL EXCHANGES | SUCCESS PERCENTAGE | DATA RECEPTION RATE | LAST DATA STORAGE LOCATION |
|---|---|---|---|---|---|
| C0001 | 5 | 5 | 100% | 216/216 | ABC |
| C0002 | 3 | 3 | 100% | 250/250 | DEF |
| C0003 | 10 | 7 | 70% | 72/130 | GHI |

UNIT-TO-UNIT DATA EXCHANGE SYSTEM, AND UNIT, EXCHANGE COMPLETION DATA KEEPING DEVICE AND PROGRAM FOR USE IN THE SAME

BACKGROUND OF THE INVENTION

1. Field of the Invention

The present invention relates to a system for exchanging electronic data between units, and more particularly to a system in which the exchange process can be completed in a fair manner for both of the units involved in the exchange process.

2. Description of the Related Art

With high-speed communications networks, such as ADSL (Asymmetric Digital Subscriber Line) and FTTH (Fiber To The Home), becoming more widespread in recent years, P2P (Peer To Peer) data exchange systems have been used for exchanging electronic data between units.

Early P2P systems were pure P2P data exchange systems in which each system included only two units. For example, WinMX is one of such systems. In a pure P2P data exchange system, a unit only has 1) a function of requesting the other party's unit to transmit data of interest, 2) a function of transmitting data requested by the other party's unit, 3) a function of receiving data from the other party's unit, and 4) a function of discontinuing data transmission to the other party's unit. With these functions, data can be transmitted and received by each other. However, due to the difference in data size between exchanged data or the difference in data transmission/reception speed between the units, one unit may complete receiving data earlier than the other unit. Therefore, in a pure P2P data exchange system, a first party may discontinue the data transmission to a second party when the first party completes receiving the data of interest. This unfairly prevents the second party from completing the data reception while the first party has completed receiving the data of interest.

In view of this, methods for preventing such an unfair practice have been proposed in the art, in which a server is provided that functions as a mediator for the data exchange process (see, for example, U.S. Pat. No. 6,061,792, and "Asynchronous Protocols for Optimistic Fair Exchange" by N. Asokan, Victor Shoup and Michael Waidner, Research Report RZ 2976 (#93022), IBM Research, December 1997).

In such a P2P data exchange system with a mediator server, data to be exchanged is first uploaded to the mediator server before initiating the data exchange between the units so that it is possible to address a situation where either unit fails to obtain the data of interest due to a certain problem during the data exchange between the units. In the P2P data exchange system with a mediator server, even if one terminal becomes unable to obtain the data of interest during the data exchange between the units, the unit failing to obtain the data of interest can be complemented with the data from the mediator server because the mediator server has the data being exchanged.

BRIEF DESCRIPTION OF THE INVENTION

The following problems arise when using a pure P2P data exchange system such as WinMx. If an unfair practice, as described above, occurs during a data exchange between units, the user of one unit may wish to discontinue the data exchange. For example, in a data exchange between unit A and unit B, if unit A obtains data of interest earlier than unit B and terminates the communication session with unit B, the user of unit B may be displeased by the failure to obtain data from unit A and may desire to stop the data exchange with unit A. However, in such a situation, unit B is no longer able to, for example, invalidate or retrieve the data that has been completely passed to unit A. Thus, in a conventional pure P2P data exchange system, a unit cannot cancel a data exchange that is once decided to be performed if the other unit first completes receiving data of interest. Therefore, in the case of an unfair exchange, there may occur a situation where only one party gains to obtain the data of interest while the other party gains nothing.

In a P2P data exchange system with a mediator server, data is exchanged between terminals after the data is once uploaded to the mediator server. Therefore, if the communication session fails for one terminal, data is transmitted to the terminal from the mediator server, thereby ensuring that both terminals obtain data of interest. However, since data to be exchanged between the units need to be first uploaded to the mediator server, the communications cost and the load on the mediator server increase in proportion to the amount of the exchanged data.

Therefore, an object of the present invention is to provide (i) a unit-to-unit data exchange system in which an unfair exchange is prevented without increasing the communications cost or the load on the server, (ii) a unit, and (iii) a server and a program for use in such a system. To achieve the above object, the present invention has the following aspects. A first aspect of the present invention is directed to a system for exchanging data between units connected to each other via a communications medium. This system includes: a first unit having at least one piece of data that can be exchanged and requesting to exchange data with another unit; a second unit having data of interest to the first unit; and an exchange completion data keeping device connected to the first and second units via the communications medium, the exchange completion data keeping device being (i) for keeping first exchange completion data that is necessary, after completion of the data exchange between the first and second units, (ii) for reproducing data obtained by the first unit and second exchange completion data that is necessary, after completion of the data exchange between the first and second units, and (iii) for reproducing data obtained by the second unit, wherein the exchange completion data keeping device includes exchange completion data transmission means for transmitting the first exchange completion data to the first unit and the second exchange completion data to the second unit only when the first and second units have successfully received data of interest.

Preferably, the first unit includes: first exchange completion data production means for producing the second exchange completion data; and first exchange completion data transmission means for transmitting the second exchange completion data produced by the first exchange completion data production means to the exchange completion data keeping device. Further, the second unit includes: second exchange completion data production means for producing the first exchange completion data; and second exchange completion data transmission means for transmitting the first exchange completion data produced by the second exchange completion data production means to the exchange completion data keeping device. The exchange completion data keeping device further includes exchange completion data keeping means for keeping the first and second exchange completion data transmitted from the exchange completion data transmission means so that each unit from which the exchange completion data has been transmitted can be identified.

Preferably, the first unit further includes: first data conversion means for converting data owned by the first unit to data that can be reproduced successfully only by using the second exchange completion data; and first data recovery means for recovering data that can be reproduced successfully from data received from the second unit by using the first exchange completion data. Further, the second unit includes: second data conversion means for converting data owned by the second unit to data that can be reproduced successfully only by using the first exchange completion data; and second data recovery means for recovering data that can be reproduced successfully from data received from the first unit by using the second exchange completion data.

Preferably, the first unit further includes first exchange completion data production requesting means for requesting the exchange completion data keeping device to produce the second exchange completion data. In addition, the second unit includes second exchange completion data production requesting means for requesting the exchange completion data keeping device to produce the first exchange completion data. The exchange completion data keeping device further includes: exchange completion data production means for producing the first and second exchange completion data in response to the requests from the first and second exchange completion data production requesting means; and exchange completion data keeping means for keeping the first and second exchange completion data produced by the exchange completion data production means so that each requesting unit can be identified.

Preferably, each of the first and second units further includes: data conversion means for converting first data owned by the unit to second data that can be reproduced successfully only by using the exchange completion data; and data recovery means for recovering data that can be reproduced successfully from data received from the other unit by using the exchange completion data transmitted from the exchange completion data transmission means. The exchange completion data keeping device further includes conversion process data production/transmission means for producing first and second conversion process data used for (i) converting the first data to the second data that can be reproduced successfully by using the first and second exchange completion data, and (ii) transmitting the first conversion process data to the second unit and the second conversion process data to the first unit. The data conversion means of the first unit converts the first data to the second data by using the second conversion process data from the conversion process data transmission means. The data conversion means of the second unit converts the first data to the second data by using the first conversion process data from the conversion process data transmission means.

For example, the first conversion process data is a first encryption key, the first exchange completion data is a first decryption key corresponding to the first encryption key, the second conversion process data is a second encryption key, and the second exchange completion data is a second decryption key corresponding to the second encryption key.

Preferably, each of the first and second units further includes communication result notification means for notifying the exchange completion data keeping device of a communication result when a communication session with the other unit is terminated. Further, the exchange completion data transmission means determines whether or not both of the first and second units have successfully received data of interest based on the communication results from the communication result notification means of the first unit and that of the second unit.

Preferably, the communication result is information indicating whether or not the data of interest has been received successfully. The exchange completion data transmission means transmits exchange completion data if the exchange completion data transmission means receives information indicating that the data has been received successfully from both the first and second units.

For example, the first exchange completion data is a decryption key used for decrypting data given by the second unit to the first unit, and the second exchange completion data is a decryption key used for decrypting data given by the first unit to the second unit.

Preferably, each of the first and second units further includes resend requesting means for requesting the other unit to resend data of interest if the unit fails to fully receive the data of interest.

A second aspect of the present invention is directed to a unit for exchanging data owned by the unit with data of interest owned by another unit. The unit includes: exchange completion data production means for producing first exchange completion data that is necessary for reproducing the data owned by the unit; exchange completion data registration means for registering the first exchange completion data produced by the exchange completion data production means at an exchange completion data keeping device for keeping exchange completion data; and exchange completion data obtaining means for obtaining, from the exchange completion data keeping device, second exchange completion data that is necessary for reproducing data obtained from the other unit when a communication session with the other unit is terminated.

Preferably, the unit further includes: data conversion means for converting data owned by the unit to data that can be reproduced successfully only by using the first exchange completion data; and data recovery means for recovering data that can be reproduced successfully from data received from the other unit by using the second exchange completion data obtained by the exchange completion data obtaining means.

Preferably, the unit further includes exchange history storing means for storing a history of data exchanges made with other units, wherein: the data conversion means changes a data conversion method based on the exchange history; and the exchange completion data production means changes a method of producing exchange completion data based on the exchange history.

Preferably, the unit further includes resend requesting means for requesting the other unit to resend data of interest if the unit fails to fully receive the data of interest.

A third aspect of the present invention is directed to a unit for exchanging data owned by the unit with data of interest owned by another unit. The unit includes: exchange completion data production requesting means for requesting an exchange completion data keeping device for keeping exchange completion data to produce first exchange completion data that is necessary for reproducing the data owned by the unit; and exchange completion data obtaining means for obtaining, from the exchange completion data keeping device, second exchange completion data that is necessary for reproducing data obtained from the other unit when a communication session with the other unit is terminated.

Preferably, the unit further includes: conversion process data reception means for receiving conversion process data used for converting the data owned by the unit so that the data can be reproduced successfully by using the first exchange completion data sent from the exchange completion data keeping device; data conversion means for converting the data owned by the unit by using the conversion process data received by the conversion process data reception means; and data recovery means for recovering data that can be reproduced successfully from data obtained from the other unit by using the second exchange completion data obtained by the exchange completion data obtaining means.

Preferably, the unit further includes: exchange history storing means for storing a history of data exchanges made with other units; and conversion method notification means for notifying the exchange completion data keeping device of a conversion method used by the data conversion means based on the exchange history, wherein the data conversion means converts the data owned by the unit by using conversion process data using the specified conversion method sent from the exchange completion data keeping device.

Preferably, the unit further includes resend requesting means for requesting the other unit to resend data of interest if the unit fails to fully receive the data of interest.

A fourth aspect of the present invention is directed to an exchange completion data keeping device used in a system for exchanging data between units connected to each other via a communications medium. The exchange completion data keeping device includes: exchange completion data keeping means for keeping exchange completion data necessary for reproducing data exchanged between a first unit and a second unit; and exchange completion data transmission means for transmitting exchange completion data that is necessary for reproducing data obtained by the first unit to the first unit and transmitting exchange completion data that is necessary for reproducing data obtained by the second unit to the second unit only when both of the first and second units have successfully received data of interest.

Preferably, the exchange completion data keeping device further includes: exchange completion data production means for producing the exchange completion data in response to a request from the first and second units; and exchange completion data keeping means for keeping the exchange completion data produced by the exchange completion data production means so that each requesting unit can be identified.

Preferably, the exchange completion data keeping device further includes conversion process data production/transmission means for producing conversion process data such that exchanged data can be reproduced successfully at the first and second units by using the exchange completion data produced by the exchange completion data production means, and for transmitting the conversion process data to the first and second units.

Preferably, the exchange completion data transmission means determines whether or not both of the first and second units have successfully received data of interest based on communication results from the first and second units.

For example, the communication result is information indicating whether or not the data of interest has been received successfully. The exchange completion data transmission means transmits exchange completion data when receiving information indicating that the data has been received successfully from the first and second units.

Preferably, the exchange completion data keeping device further includes exchange completion data deletion means for deleting exchange completion data kept by the exchange completion data keeping device if a predetermined condition is met.

For example, the predetermined condition is such that the exchange completion data deletion means deletes exchange completion data transmitted to the first and second units from the exchange completion data transmission means if the first and second units have successfully received the transmitted exchange completion data.

For example, the predetermined condition is such that the exchange completion data deletion means deletes the exchange completion data registered by the first and second units if the exchange completion data deletion means is notified from either unit that the data of interest has not been received successfully.

A fifth aspect of the present invention is directed to a program for instructing a computer device to exchange data owned by the computer device with data of interest owned by another computer device. The program causing the computer device to execute a method including: instructing the computer device to produce first exchange completion data that is necessary for reproducing the data owned by the computer device; instructing the computer device to register the produced first exchange completion data at an exchange completion data keeping device for keeping exchange completion data; and instructing the computer device to obtain, from the exchange completion data keeping device, second exchange completion data that is necessary for reproducing data obtained from the other computer device when a communication session with the other computer device is terminated.

A sixth aspect of the present invention is directed to a program for instructing a computer device to exchange data owned by the computer device with data of interest owned by another computer device. The program causing the computer device to execute a method including: instructing the computer device to request an exchange completion data keeping device for keeping exchange completion data to produce first exchange completion data that is necessary for reproducing the data owned by the computer device; and instructing the computer device to obtain, from the exchange completion data keeping device, second exchange completion data that is necessary for reproducing data obtained from the other computer device when a communication session with the other computer device is terminated.

A seventh aspect of the present invention is directed to a program for instructing a computer device, which is used in a system for exchanging data between computer devices connected to each other via a communications medium, to function as: exchange completion data keeping means for keeping exchange completion data necessary for reproducing data exchanged between a first computer device and a second computer device; and exchange completion data transmission means for transmitting exchange completion data that is necessary for reproducing data obtained by the first computer device to the first computer device and for transmitting exchange completion data that is necessary for reproducing data obtained by the second computer device to the second computer device only when both of the first and second computer devices have successfully received data of interest.

The effects of the present invention will now be described. According to the present invention, the data to be exchanged between units will not themselves be uploaded to the mediating server (the exchange completion data keeping device), but only those data (the exchange completion data) that are necessary for completing the data exchange are uploaded to the exchange completion data keeping device being the server. This reduces the problem that the communications cost and the load on the mediator server increase in proportion to the amount of data exchanged between units. In addition, according to the present invention, two units exchanging data with each other can obtain the exchange completion data only when both of the units have successfully received data of interest. Therefore, in the case of an abnormal termination of the communication session, e.g., in the case of disconnection on the side of one unit whereby the other unit fail to successfully receive the data of interest, one of the units that has terminated the communication session cannot obtain the exchange completion data. Then, neither of the units will be able to reproduce the data of interest. Thus, a fair data exchange system is realized.

Moreover, the exchange completion data is produced by each unit, thereby further reducing the load on the mediating server. Each unit transmits its data to the other party's unit after converting it to data that cannot be reproduced successfully without the use of exchange completion data. Therefore, the other party's unit cannot successfully reproduce the data unless it obtains the exchange completion data.

Conversely, the server may produce the exchange completion data, in which case each unit does not have to include means for producing the exchange completion data, thus reducing the load on the unit.

For example, a unit may encrypt data and transmit the encrypted data to the other party's unit, and received data can be reproduced by using a decryption key as encrypted exchange completion data. Then, it is possible to easily realize the system of the present invention by employing commonly-available encryption/decryption software.

The exchange completion data keeping device determines whether or not each unit exchanging its data with another has successfully received data based on the communication result sent from the unit. Therefore, it is possible to easily determine whether or not the data exchange has been performed successfully.

If a unit fails to completely receive data of interest, the unit issues a resend request to the other party's unit, ensuring that the unit can completely receive the data of interest.

A unit may produce the exchange completion data based on its history of data exchanges made with other units to simplify the recovery process at the other party's unit. Thus, it is possible to provide an easy-to-use system in which an exchange with a highly trusted party can be performed quickly. Moreover, a unit may simplify the conversion of data to be transmitted based on its history of data exchanges made with other units, whereby a data exchange with a highly trusted party can be performed more quickly.

If a predetermined condition is met, the exchange completion data is deleted from the network, whereby it is possible to prevent the exchange completion data from being left unremoved for along time and being misused.

The program of the present invention can be distributed to each party's computer device to realize an easy-to-use unit-to-unit data exchange system, thus facilitating the circulation of information contents.

BRIEF DESCRIPTION OF THE DRAWINGS

FIG. 3 is a diagram illustrating an exemplary data structure of data including data IDs and associated public data IDs.

FIG. 4 is a diagram illustrating an exemplary data structure of data associated with the data IDs of FIG. 3.

FIG. 5 is a diagram illustrating a data structure of public contents information associated with the public data IDs of FIG. 3.

FIG. 11 is a block diagram illustrating a functional configuration of the inside of a public data keeping device 31.

FIG. 19 is a sequence diagram illustrating an operation of the unit 11a and the exchange completion data keeping device 21 from when the unit 11a requests the exchange completion data keeping device 21 for mediation until the unit 11a receives a response thereto in a case where an ACK message received from the unit 11b includes a public data ID of data requested by the unit 11a.

FIG. 22 is a sequence diagram illustrating an operation of the unit 11a after receiving an ACK message from the exchange completion data keeping device 21.

FIG. 23 is a sequence diagram illustrating an operation of the unit 11b when the unit 11b receives an EXCHANGE_DATA message from the unit 11a.

FIG. 25 is a sequence diagram illustrating an operation of the unit 11b when the unit 11b receives an INITIATE_EXCHANGE message from the unit 11a.

FIG. 29 is a diagram illustrating an exemplary data structure of an exchange history stored in the unit 11.

DETAILED DESCRIPTION OF THE INVENTION

First Embodiment

Figure 1:
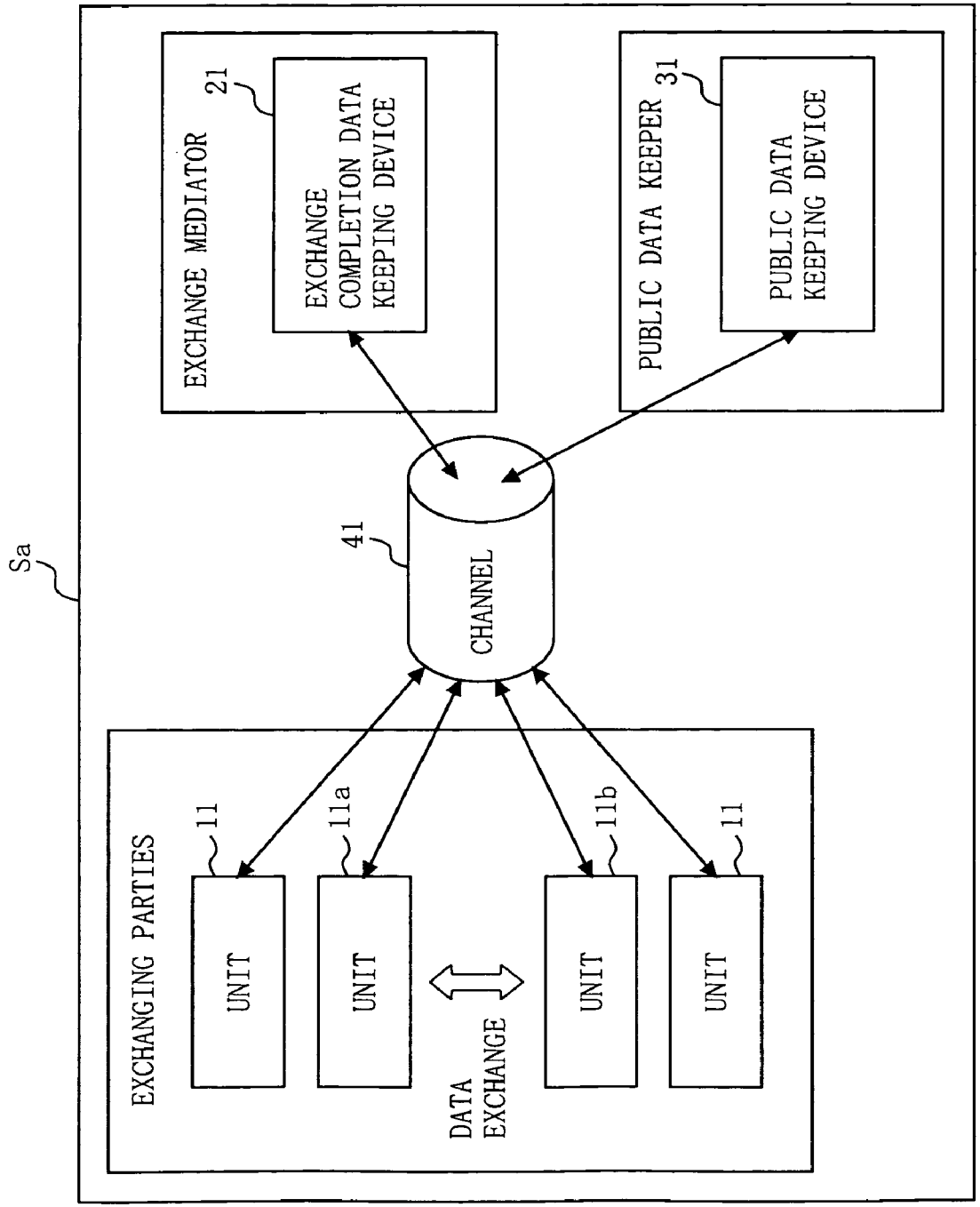
FIG. 1 is a block diagram illustrating a general configuration of a unit-to-unit data exchange system Sa with a mediator server according to a first embodiment of the present invention.

FIG. 1 is a block diagram illustrating a general configuration of a unit-to-unit data exchange system Sa with a mediator server according to the first embodiment of the present invention. Referring to FIG. 1, the unit-to-unit data exchange system Sa with a mediator server includes a plurality of units 11, an exchange completion data keeping device 21, a public data keeping device 31 and a channel 41. Note that it is assumed in FIG. 1 that a unit 11a and a unit 11b are exchanging data with each other. Hereinafter, the designation "unit 11" will be used where the exchanging unit is not particularly specified, and the designation "unit 11a" or "unit 11b" will be used where a particular exchanging unit is specified. Note that the numbers of the units 11, the exchange completion data keeping devices 21, the public data keeping devices 31 and the channels 41 are not limited to those shown in FIG. 1.

The unit 11 is a computer device having a communications function such as a personal computer, a portable communications terminal or a mobile phone, and is owned by an exchanging party. The unit 11 stores its data in a storage device such as a hard disk or a memory. The unit 11 makes public a list of exchangeable data from among all its stored data, by registering it at the public data keeping device 31. The user operating the unit 11 refers to the list of public data registered at the public data keeping device 31 to identify another unit 11 that has data of interest. If the user wishes to exchange data with the other unit 11, the user's unit 11 communicates with the other unit 11 to exchange data owned by the user's unit 11 with data owned by the other unit 11. In a data exchange, the unit 11 converts data owned by the unit 11 through a predetermined conversion method into data that cannot be reproduced by itself, and transmits the converted data to the other unit 11. When exchanging data with the other unit 11, the unit 11 produces data (hereinafter referred to as "exchange completion data") that is necessary for the exchanged data to be reproduced successfully after the completion of the data exchange, and transmits the exchange completion data to the exchange completion data keeping device 21, which keeps the exchange completion data. When the data exchange with the other party's unit 11 is completed successfully, the unit 11 receives exchange completion data produced by the other party's unit 11 and sent from the exchange completion data keeping device 21, and reproduces the data obtained through the exchange by using the received exchange completion data.

The exchange completion data will now be described. The exchange completion data is data that is necessary for successfully reproducing the data obtained from the other unit 11 through the data exchange. A typical example of the exchange completion data is a decryption key. Where a decryption key is used as the exchange completion data, the unit 11, exchanging data with the other unit 11, uses an encryption algorithm as the predetermined conversion method, and encrypts its data before transmitting the data. After the data exchange is completed successfully, the unit 11 receives a decryption key produced by the other party's unit 11 and sent from the exchange completion data keeping device 21, and decrypts the exchanged data by using the received decryption key. Thus, the obtained data can be reproduced successfully. Hereinafter, the predetermined conversion method will be referred to as the data conversion method.

Note that other examples of the exchange completion data include data of a climax portion of a film, data of a refrain portion of a musical tune, and data obtained by randomly or regularly thinning out the original data. Thus, where a portion of the original data is used as the exchange completion data, the unit 11, reproducing the exchanged data, combines the obtained exchange completion data with the exchanged data to obtain data that can be reproduced successfully. Where a portion of the original data, being the data to be exchanged, is used as the exchange completion data, the predetermined conversion method may be a method of removing a portion of the original data.

The exchange completion data keeping device 21 is a computer device such as a server, and is owned by an exchange mediator. The exchange completion data keeping device 21 keeps exchange completion data produced by various units 11. The exchange completion data keeping device 21 transmits exchange completion data that it keeps to both of the two units 11 exchanging data with each other if the exchange completion data keeping device 21 is notified of successful completion of the data exchange between the units 11.

The public data keeping device 31 is a computer device such as a server, and is owned by a public data keeper. The public data keeping device 31 keeps a public data list, i.e., a list of data that is registered by the users of the units 11 as being data that is allowed by the users to be exchanged.

While the channel 41 is typically a high-speed communications network using optical fibers such as FTTH, it is not limited thereto as long as it is a communications medium via which electronic data can be transmitted/received, such as ADSL, the Internet, satellite broadcasting, a wireless communications network, a premises LAN, or a wireless LAN.

Figure 2:
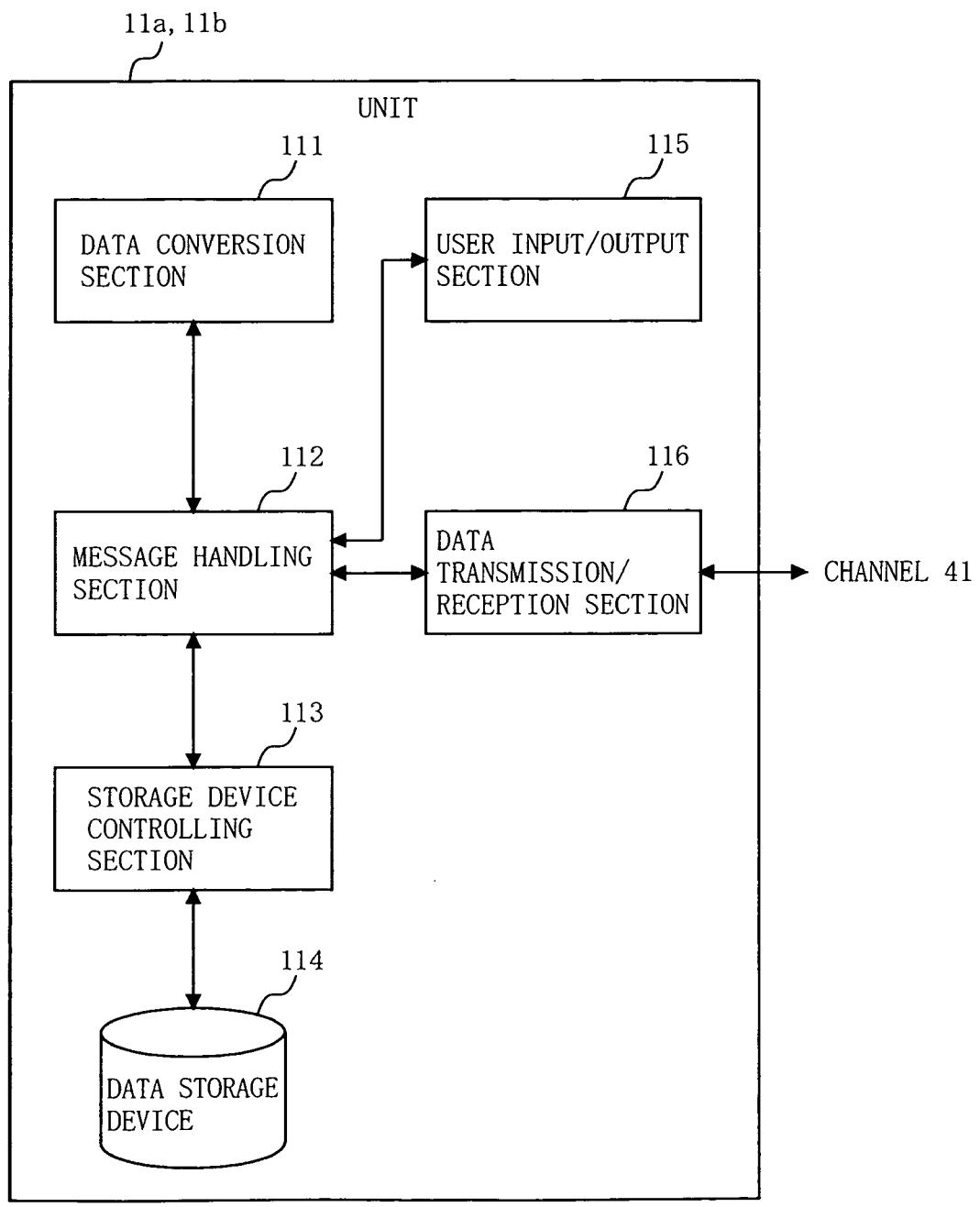
FIG. 2 is a block diagram illustrating a functional configuration of the inside of a unit 11.

FIG. 2 is a block diagram illustrating a functional configuration of the inside of the unit 11. Referring to FIG. 2, the unit 11 includes a data conversion section 111, a message handling section 112, a storage device controlling section 113, a data storage device 114, a user input/output section 115 and a data transmission/reception section 116.

The data conversion section 111 uses a predetermined data conversion method to convert data sent from the message handling section 112 according to a specified request. The data conversion section 111 may be implemented by hardware such as a dedicated LSI or by a program that is run by a general-purpose CPU.

The message handling section 112 communicates with the data conversion section 111, the storage device controlling section 113, the user input/output section 115 and the data transmission/reception section 116, and handles messages therefrom. The message handling section 112 may be implemented by hardware such as a dedicated LSI or by a program that is run by a general-purpose CPU.

The storage device controlling section 113 inputs/outputs data to/from the data storage device 114. The storage device controlling section 113 may be implemented by hardware such as a dedicated LSI or by a device driver of the data storage device 114 that is run by a general-purpose CPU.

The data storage device 114 is a storage device such as a hard disk or a memory for recording various data. The data storage device 114 stores data that may be made public. Each piece of data that may be made public is assigned a public data ID associated with the data ID of the data. Moreover, the public data ID is associated with information that describes the substantial contents of the data (hereinafter referred to as "contents information").

FIG. 3 is a diagram illustrating an exemplary data structure of data including data IDs and associated public data IDs. Referring to FIG. 3, in section D401, for example, the data ID "DATA_ID-1111" and the public data ID "PUBLIC_DATA_ID-1111" are associated with each other. In section D402, the data ID "DATA_ID-2222" and the public data ID "PUBLIC_DATA_ID-2222" are recorded as being associated with each other.

FIG. 4 is a diagram illustrating an exemplary data structure of data associated with the data IDs of FIG. 3. Referring to FIG. 4, section D501, for example, represents the data ID and section D502 represents the substance of the data that is associated with the data ID in section D501. The substance of data refers to, for example, digital data of a film, a musical tune, etc. Thus, the substance of data associated with each data ID is stored in the data storage device 114.

FIG. 5 is a diagram illustrating a data structure of public contents information associated with the public data IDs of FIG. 3. Section D601 represents the public data ID, and section D602 represents the public contents information that is associated with the public data ID in section D601. The public contents information includes, for example, the contents title and information indicating how much right to the contents is remaining (the remaining number of times the contents can be reproduced, and the expiration date thereof). Note that FIG. 5 shows an example where the public contents information indicates "Contents title: The Blue City", "Remaining number of times of reproduction: 7" and "Expiration date: Mar. 31, 2003".

The unit 11 uploads a list of public data IDs and associated public contents information to the public data keeping device 31. The list is kept by the public data keeping device 31 as a public data list.

The user input/output section 115 includes an input device, such as a keyboard, a mouse, a button switch, etc., for receiving data inputs from the user operating the unit 11, a display device, such as a CRT, an LCD, etc., for displaying the contents of data, and a sound output device, such as a speaker, etc., for outputting the contents of data as sound. The user input/output section 115 is responsible for a data input operation and a data output operation.

The data transmission/reception section 116 is a communications device, such as data circuit-terminating equipment, etc., for transmitting/receiving data to/from the other unit 11, the exchange completion data keeping device 21 and the public data keeping device 31 via the channel 41.

Figure 6:
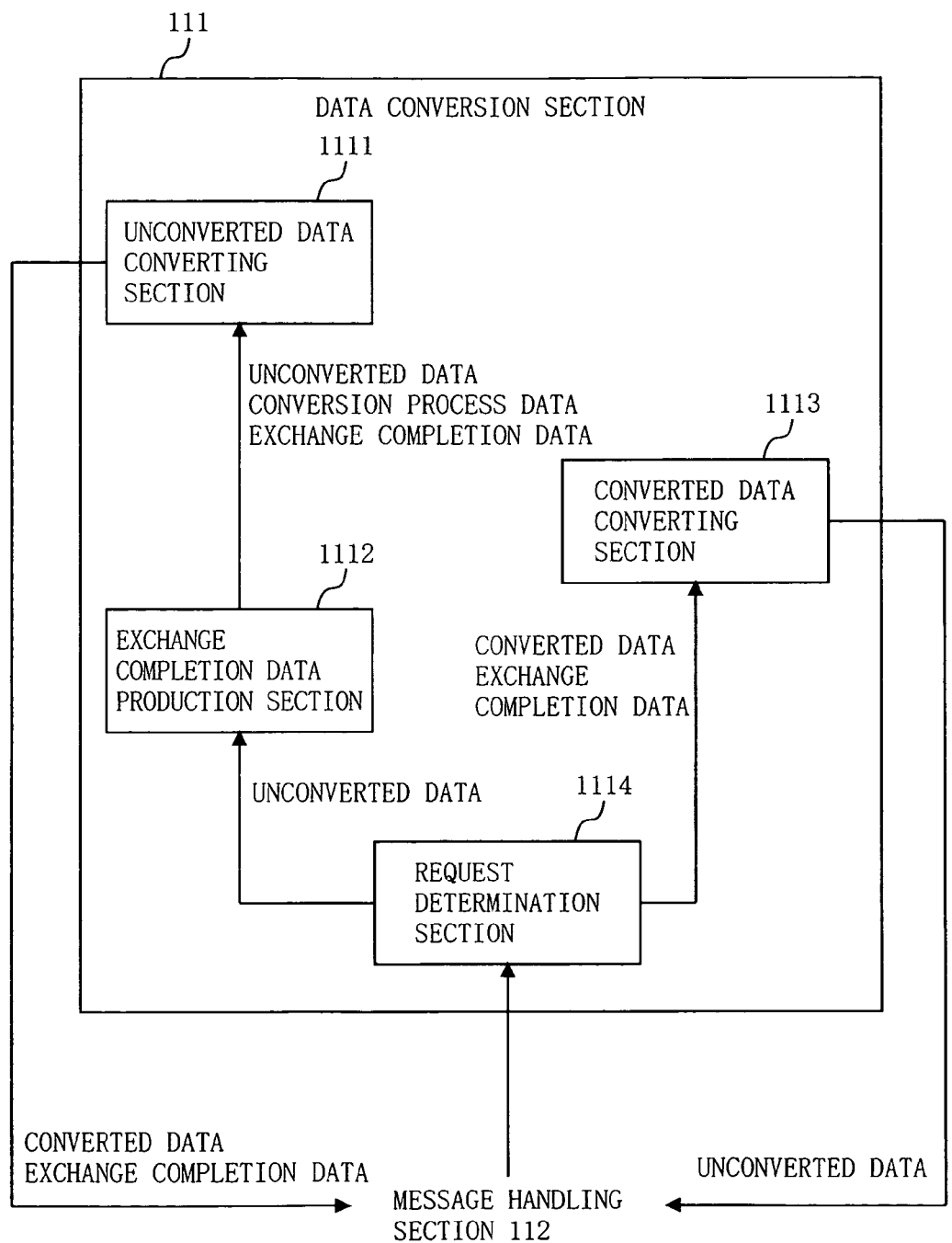
FIG. 6 is a block diagram illustrating a detailed functional configuration of the inside of a data conversion section 111.

FIG. 6 is a block diagram illustrating a detailed functional configuration of the inside of the data conversion section 111. Referring to FIG. 6, the data conversion section 111 includes an unconverted data converting section 1111, an exchange completion data production section 1112, a converted data converting section 1113 and a request determination section 1114.

The unconverted data converting section 1111 converts data of the unit 11 based on a predetermined data conversion method. The data before being converted will hereinafter be referred to as unconverted data. The data, after being converted, will be referred to as converted data. The unconverted data converting section 1111 sends, to the message handling section 112, the exchange completion data sent from the exchange completion data production section 1112 and the converted data.

For example, where an encryption method is used as the predetermined data conversion method, the unconverted data is unencrypted data and the converted data is encrypted data. Where a conversion method of removing a climax portion of a film is used as the predetermined data conversion method, the converted data is the data obtained by removing the climax portion. This similarly applies to a conversion method in which a refrain portion is taken out. Note that as the contents provider previously specifies the climax portion or the refrain portion, the unconverted data converting section 1111 can identify the portion. Where a method of thinning out data is used as the predetermined data conversion method, the unconverted data converting section 1111 produces the converted data by removing specified portions to be thinned out from the unconverted data.

The exchange completion data production section 1112 produces conversion process data that is necessary for the conversion from the unconverted data to the converted data, and exchange completion data that is necessary for restoring the unconverted data from the converted data, and sends these data to the unconverted data converting section 1111. Where an encryption method is used as the data conversion method at the unconverted data converting section 1111, the conversion process data is an encryption key for encrypting data. Then, the exchange completion data is decryption key data for decrypting the encrypted data.

Where another method of removing a portion of data is used as the data conversion method, the conversion process data is data that specifies the portion to be taken out. Then, the exchange completion data is the taken-out portion of the data. Note that where a method of removing a portion of data is used as the data conversion method, the flow of the process performed between the exchange completion data production section 1112 and the unconverted data converting section 1111 is reversed from that shown in FIG. 6. In the following description, it is assumed for the sake of simplicity that an encryption method is used as the data conversion method unless otherwise specified. Even if other data conversion methods are used, the feature that the exchange completion data is produced and that the converted data can be reproduced successfully only by using the exchange completion data will not change substantially, and minor changes to the process flow can be made easily.

The converted data converting section 1113 converts the converted data obtained from the other unit 11 to unconverted data by using the exchange completion data obtained from the exchange completion data keeping device 21, and sends the unconverted data to the message handling section 112. Specifically, where the exchange completion data is a decryption key, the converted data converting section 1113 decrypts the converted data, which has been encrypted, by using the exchange completion data to obtain the unconverted data.

The request determination section 1114 determines the contents of the request sent from the message handling section 112 to perform a predetermined process. If the received request is a request to convert unconverted data to converted data, the request determination section 1114 sends the unconverted data, which has been received together with the request, to the exchange completion data production section 1112. If the received request is a request to convert converted data to unconverted data, the request determination section 1114 sends the converted data and the exchange completion data, which have been received together with the request, to the converted data converting section 1113.

Figure 7:
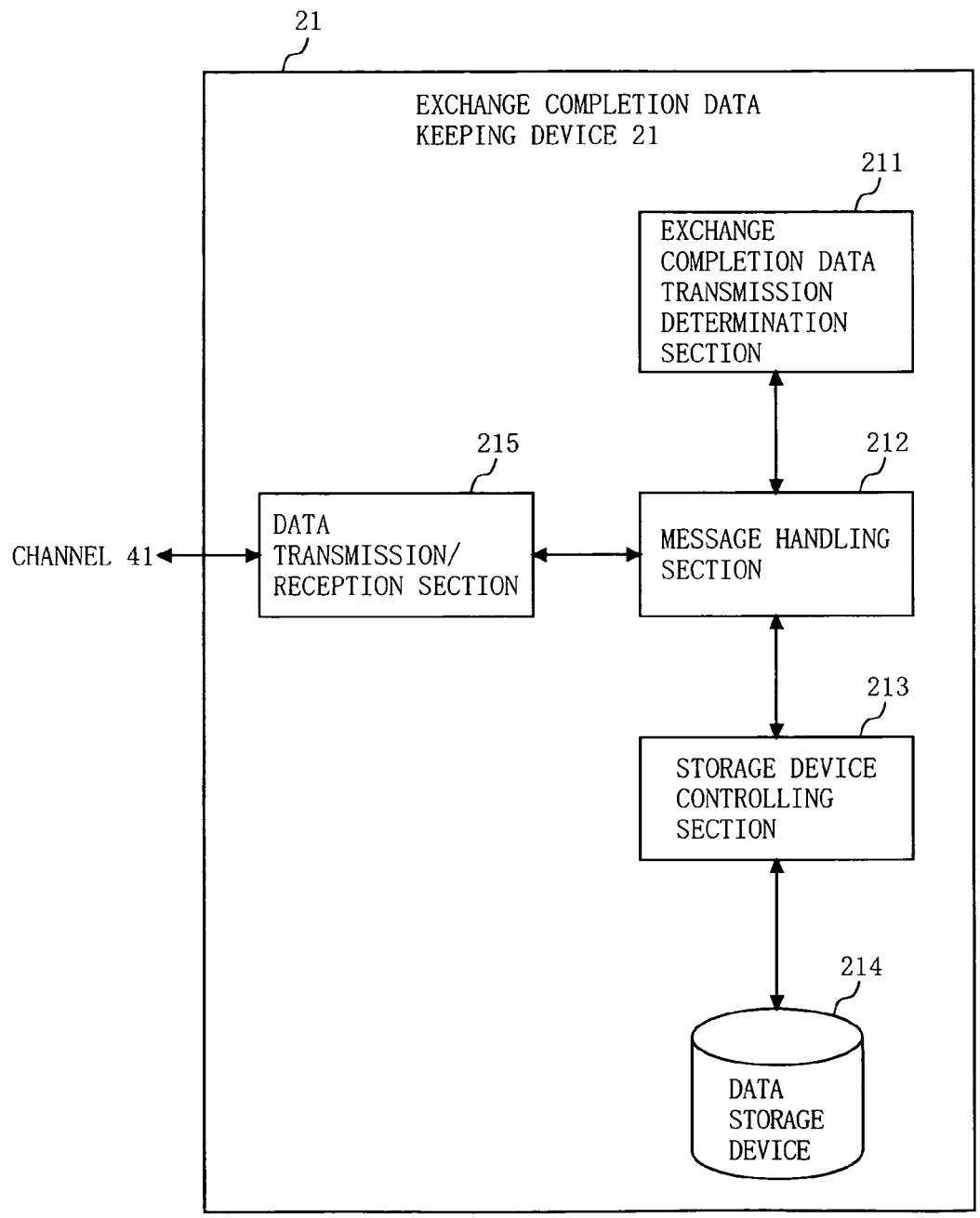
FIG. 7 is a block diagram illustrating a functional configuration of the inside of an exchange completion data keeping device 21.

FIG. 7 is a block diagram illustrating a functional configuration of the inside of the exchange completion data keeping device 21. Referring to FIG. 7, the exchange completion data keeping device 21 includes an exchange completion data transmission determination section 211, a message handling section 212, a storage device controlling section 213, a data storage device 214 and a data transmission/reception section 215.

The exchange completion data transmission determination section 211 produces a determination table including unit IDs and associated exchange completion data sent from the units 11, and registers, in the determination table, information indicating whether or not there has been a notification from the unit 11 that the data exchange has been completed successfully. Based on the registered information, the exchange completion data transmission determination section 211 determines whether or not to transmit the exchange completion data to the unit 11. Specifically, the exchange completion data transmission determination section 211 determines that exchange completion data can be transmitted to the units 11*a* and 11*b* only when it receives a notification that the data exchange has been completed successfully both from the unit 11*a* and from the unit 11*b*. The exchange completion data transmission determination section 211 may be implemented by hardware such as a dedicated LSI or by a program that is run by a general-purpose CPU.

The message handling section 212 communicates with the exchange completion data transmission determination section 211, the storage device controlling section 213 and the data transmission/reception section 215, and handles messages therefrom. The message handling section 212 may be implemented by hardware such as a dedicated LSI or by a program that is run by a general-purpose CPU.

The storage device controlling section 213 inputs/outputs data to/from the data storage device 214. The storage device controlling section 213 may be implemented by hardware such as a dedicated LSI or by a device driver of the data storage device 214 that is run by a general-purpose CPU.

The data storage device 214 is a storage device such as a hard disk or a memory for recording various data. The data storage device 214 stores exchange completion data sent from the unit 11, together with the determination table used for determining whether or not to transmit the exchange completion data. The determination table includes the ID (hereinafter referred to as the "unit ID") of the unit 11 that has transmitted the exchange completion data and that is associated with the ID (hereinafter referred to as the "exchange completion data ID") of the exchange completion data, and a completion notification flag indicating whether or not there has been a notification from the unit 11 associated with the unit ID that the data exchange has been completed successfully.

Figure 8:
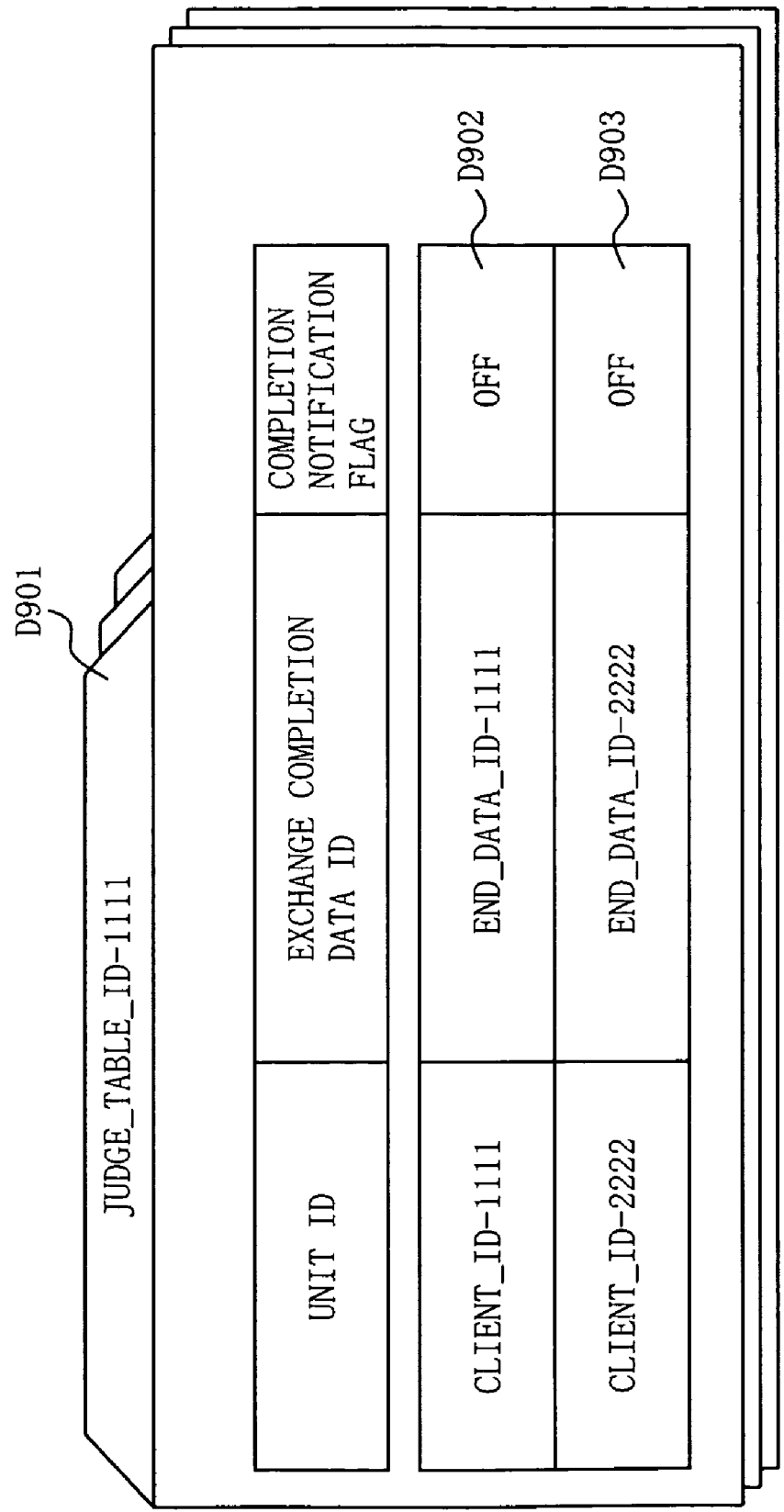
FIG. 8 is a diagram illustrating an exemplary data structure of a determination table.

FIG. 8 is a diagram illustrating an exemplary data structure of the determination table. Referring to FIG. 8, in a determination table D901 whose determination table ID is "JUDGE TABLE ID-1111", for example, section D902 includes the unit ID "CLIENT_ID-1111", the exchange completion data ID "END_DATA_ID-1111" and the completion notification flag "OFF" being associated with one another, and section D903 includes the unit ID "CLIENT_ID-2222", the exchange completion data ID "END_DATA_ID-2222" and the completion notification flag "OFF" being associated with one another. The completion notification flag is turned "ON" if there is a notification that the reception of data being exchanged has been completed successfully from the other party's unit, and is turned "OFF" if there is a notification that the reception of data being exchanged cannot be completed due to a certain abnormality occurring during the data exchange. Thus, the determination table is used to keep exchange completion data so that it is possible to specify the unit from which the exchange completion data has been transmitted.

Figure 9:
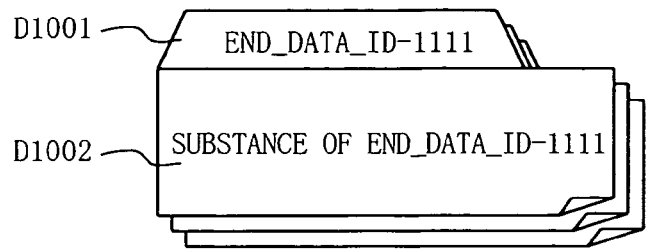
FIG. 9 is a diagram illustrating an exemplary data structure of exchange completion data associated with exchange completion data IDs of FIG. 8.

FIG. 9 is a diagram illustrating an exemplary data structure of exchange completion data associated with exchange completion data IDs of FIG. 8. Referring to FIG. 9, section D1001 represents the exchange completion data ID, and section D1002 represents the substance of the exchange completion data associated with the exchange completion data ID in section D1001. The substance of exchange completion data herein refers to the contents of the exchange completion data sent from the unit 11. Thus, the data storage device 214 stores the exchange completion data together with the determination table.

The data transmission/reception section 215 is a communications device for transmitting/receiving data to/from the unit 11 and the public data keeping device 31 via the channel 41.

Figure 10:
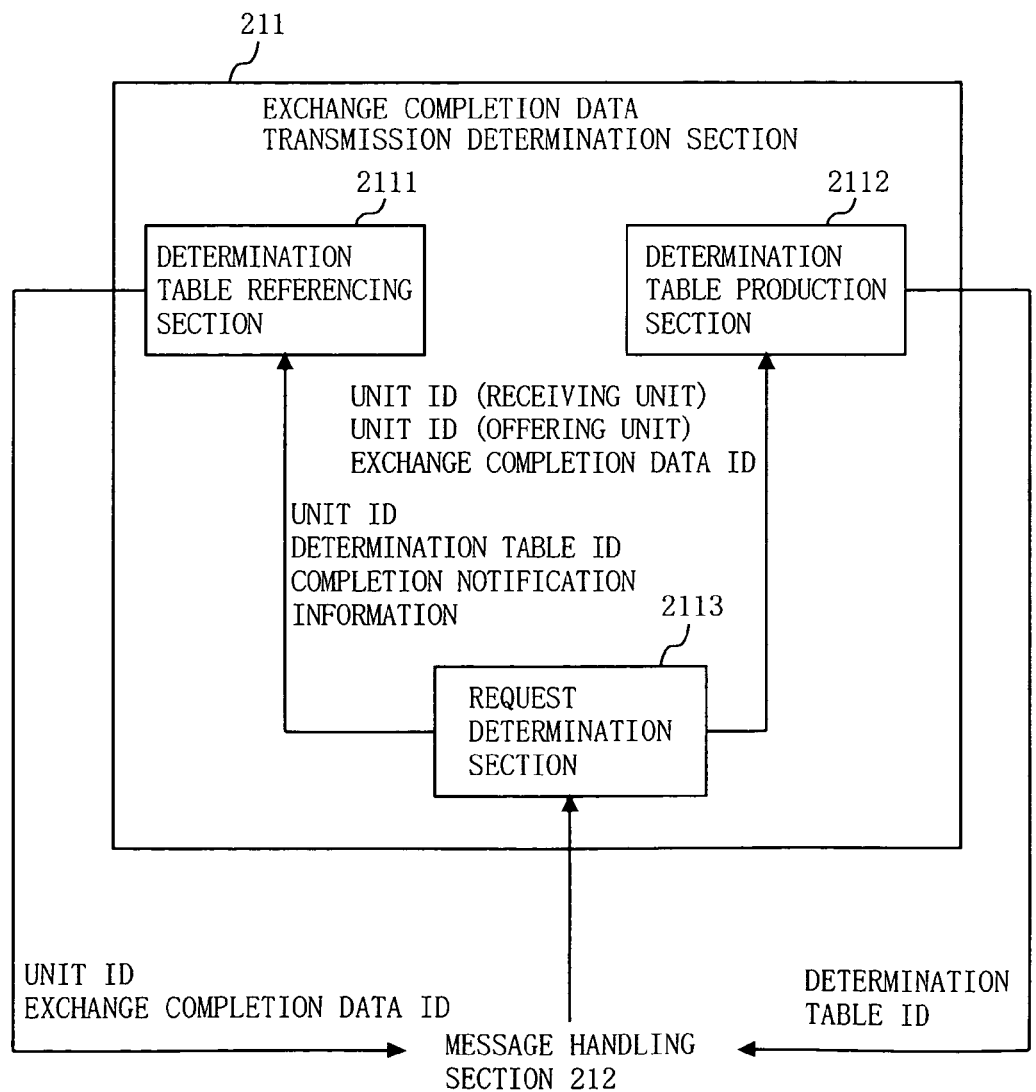
FIG. 10 is a block diagram illustrating a detailed functional configuration of the inside of an exchange completion data transmission determination section 211.

FIG. 10 is a block diagram illustrating a detailed functional configuration of the inside of the exchange completion data transmission determination section 211. Referring to FIG. 10, the exchange completion data transmission determination section 211 includes a determination table referencing section 2111, a determination table production section 2112 and a request determination section 2113.

The request determination section 2113 determines the contents of the request sent from the message handling section 212 to perform a predetermined process. If the received request is a request to register exchange completion data, the request determination section 2113 sends the unit IDs of the receiving unit and the offering unit and the exchange completion data IDs from both of the units to the determination table production section 2112, and requests the determination table production section 2112 to produce a determination table. If the received request is a request to determine whether or not to transmit the exchange completion data based on a notification of data exchange completion from the unit 11, the request determination section 2113 sends, to the determination table referencing section 2111, the unit ID of the unit 11 that has given the completion notification, the determination table ID associated with the unit ID, and the completion notification information included in the completion notification, and requests the determination table referencing section 2111 to determine whether or not to transmit the exchange completion data.

Based on the data from the request determination section 2113, the determination table production section 2112 produces and stores a determination table in the data storage device 214, and sends the ID of the determination table to the message handling section 212. Note that the path, via which the determination table production section 2112 stores the determination table in the data storage device 214, is not shown in the figure.

Based on the data from the request determination section 2113, the determination table referencing section 2111 references the determination table stored in the data storage device 214 to determine whether or not to transmit the exchange completion data. Specifically, only if the completion notification flags in the determination table are both "OK", i.e., only if a notification of the successful completion of the data exchange has been received from both of the two units 11 exchanging data, the determination table referencing section 2111 determines that the exchange completion data can be transmitted. If it is determined that the exchange completion data can be transmitted, the determination table referencing section 2111 sends the unit ID of each receiving unit 11 and the exchange completion data ID to the message handling section 212.

FIG. 11 is a block diagram illustrating a functional configuration of the inside of the public data keeping device 31. Referring to FIG. 11, the public data keeping device 31 includes a message handling section 311, a storage device controlling section 312, a data storage device 313 and a data transmission/reception section 314.

The message handling section 311 communicates with the storage device controlling section 312 and the data transmission/reception section 314, and handles messages therefrom. The message handling section 311 may be implemented by hardware such as a dedicated LSI or by a program that is run by a general-purpose CPU.

The storage device controlling section 312 inputs/outputs data to/from the data storage device 313. The storage device controlling section 312 may be implemented by hardware such as a dedicated LSI or by a device driver of the data storage device 313 that is run by a general-purpose CPU.

The data transmission/reception section 314 is a communications device for transmitting/receiving data to/from the unit 11 and the exchange completion data keeping device 21 via the channel 41.

The data storage device 313 is a storage device such as a hard disk or a memory for recording various data. The data storage device 313 stores a public data list. The public data list includes public data IDs and unit IDs of the units 11 registering the public data (hereinafter referred to as the "registering unit IDs"). Each public data ID is associated with contents information.

Figures 12, 13:
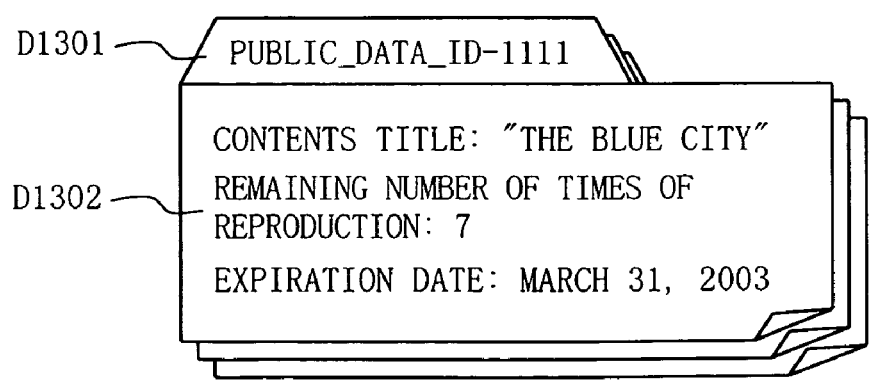
FIG. 12 is a diagram illustrating an exemplary data structure of public data list.
FIG. 13 is a diagram illustrating an exemplary data structure of contents information associated with public data IDs of FIG. 12.

FIG. 12 is a diagram illustrating an exemplary data structure of public data list. Referring to FIG. 12, for example, section D1201 includes the registering unit ID "CLIENT_ID-1111" and the public data ID "PUBLIC_DATA_ID-1111" associated with each other, and section D1202 includes the registering unit ID "CLIENT_ID-2222" and the public data ID "PUBLIC_DATA_ID-2222" associated with each other.

FIG. 13 is a diagram illustrating an exemplary data structure of contents information associated with public data IDs of FIG. 12. Referring to FIG. 13, section D1301 represents the public data ID. Section D1302 represents the contents information associated with the public data ID in section D1301. Note that the contents information in FIG. 13 indicates "contents title: The Blue City", "Remaining number of times of reproduction: 7" and "Expiration date: Mar. 31, 2003".

Now, the flow of the process in the unit-to-unit data exchange system Sa having such a configuration as described above will be described. The process in the present system can be divided into three stages. The first stage is where the unit 11 registers its public data at the public data keeping device 31. The second stage is where the unit 11a obtains, from the public data keeping device 31, a unit ID that is associated with the public data ID specified by the user. The third stage is where the unit 11a exchanges data with the unit 11b through the mediation of the exchange completion data keeping device 21. Now, an operation of the unit 11, the exchange completion data keeping device 21 and the public data keeping device 31 will be described stage by stage.

Sequence in Public Data Registering Stage

First, referring to FIG. 14 and FIG. 15, an operation of the unit 11 and the public data keeping device 31 in the stage where the unit 11 registers its public data at the public data keeping device 31 will be described.

Figure 14:
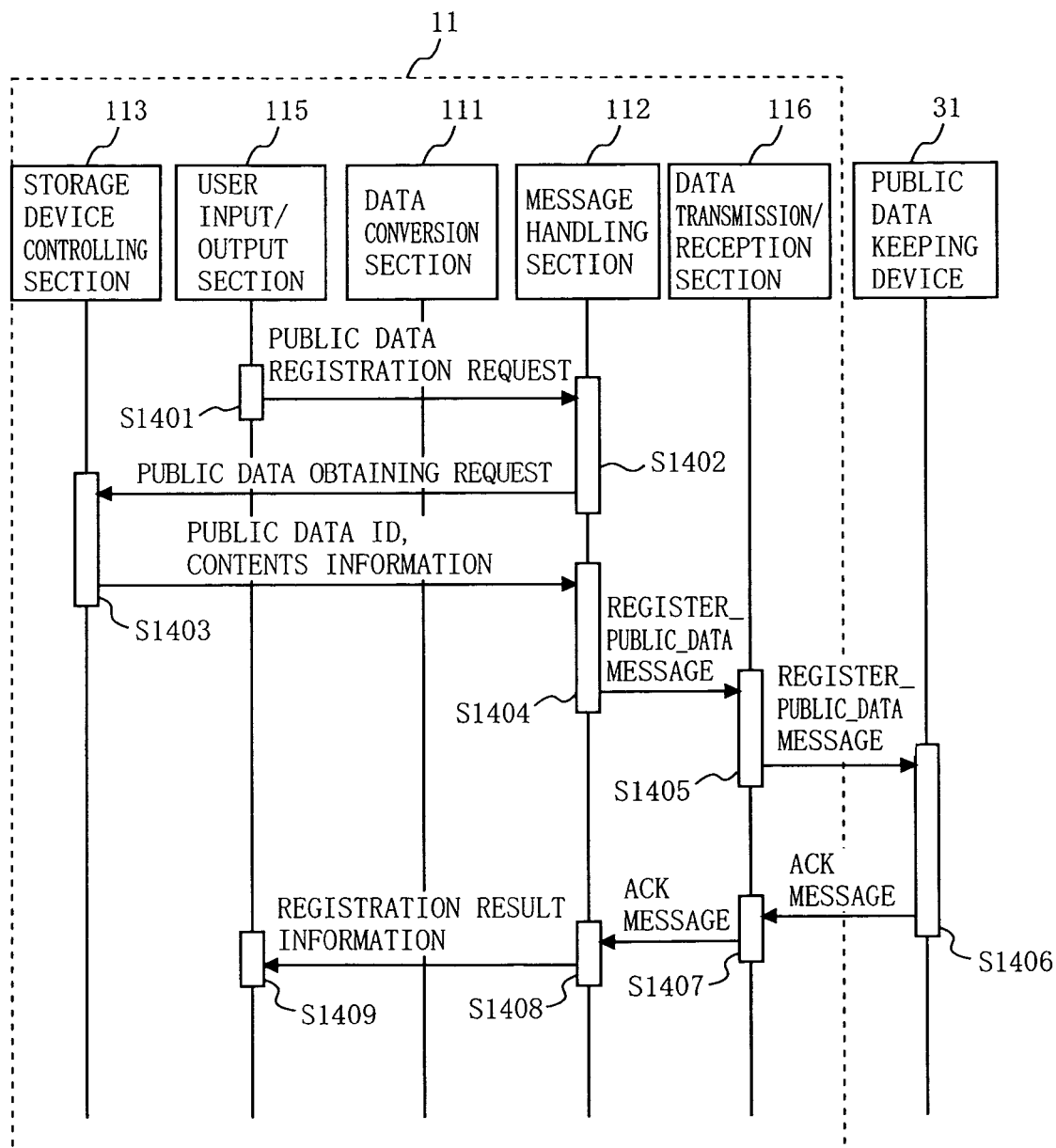
FIG. 14 is a sequence diagram illustrating an operation of the unit 11 and the public data keeping device 31 when the unit 11 registers the contents information on its public data at the public data keeping device 31.

FIG. 14 is a sequence diagram illustrating an operation of the unit 11 and the public data keeping device 31 when the unit 11 registers the contents information on its public data at the public data keeping device 31. In FIG. 14, the point in time at which each step is performed is denoted by an open rectangle while data, or the like, that is being exchanged is specified above a corresponding arrow extending between functional blocks so as to make clear what is the subject of the operation in the unit 11 and what data or message is being exchanged between functional blocks. A software functional block can be implemented by a function that is programmed to go along the flow as illustrated in the sequence diagram. A hardware functional block can be implemented by designing the hardware so that it goes along the flow as illustrated in the sequence diagram. This similarly applies to the other sequence diagrams subsequent to FIG. 14.

First, in response to an input operation by the user, the user input/output section 115 of the unit 11 obtains the data ID of the data that the user is requesting to be registered, notifies the message handling section 112 of the obtained data ID, and requests the message handling section 112 to register the public data (step S1401).

Then, in response to the public data registration request, the message handling section 112 obtains the data ID included in the request, notifies the storage device controlling section 113 of the data ID, and requests the storage device controlling section 113 to obtain the public data from the data storage device 114 (step S1402).

Then, in response to the public data obtaining request, the storage device controlling section 113 obtains the data ID included in the request, obtains the public data ID associated with the data ID and the contents information of the public data from the data storage device 114, and transmits the obtained public data ID and the contents information to the message handling section 112 (step S1403).

Then, receiving the public data ID and the contents information, the message handling section 112 produces a REGISTER_PUBLIC_DATA message including the public data ID, the contents information and the unit ID of the unit 11, and transmits the message to the data transmission/reception section 116 (step S1404). Receiving the REGISTER_PUBLIC_DATA message, the data transmission/reception section 116 transmits the message to the public data keeping device 31 (step S1405).

Receiving the REGISTER_PUBLIC_DATA message from the unit 11, the public data keeping device 31 produces a public data list based on the public data ID and the unit ID included in the message, stores the associated contents information, and transmits, to the unit 11, an ACK message indicating the result of the data registration process (step S1406).

Receiving the ACK message from the public data keeping device 31, the data transmission/reception section 116 transmits the message to the message handling section 112 (step S1407).

Receiving the ACK message, the message handling section 112 transmits the registration result information included in the message to the user input/output section 115 (step S1408). In response to this, the user input/output section 115 notifies the user of the registration result information by displaying it on the screen, etc. (step S1409).

Figure 15:
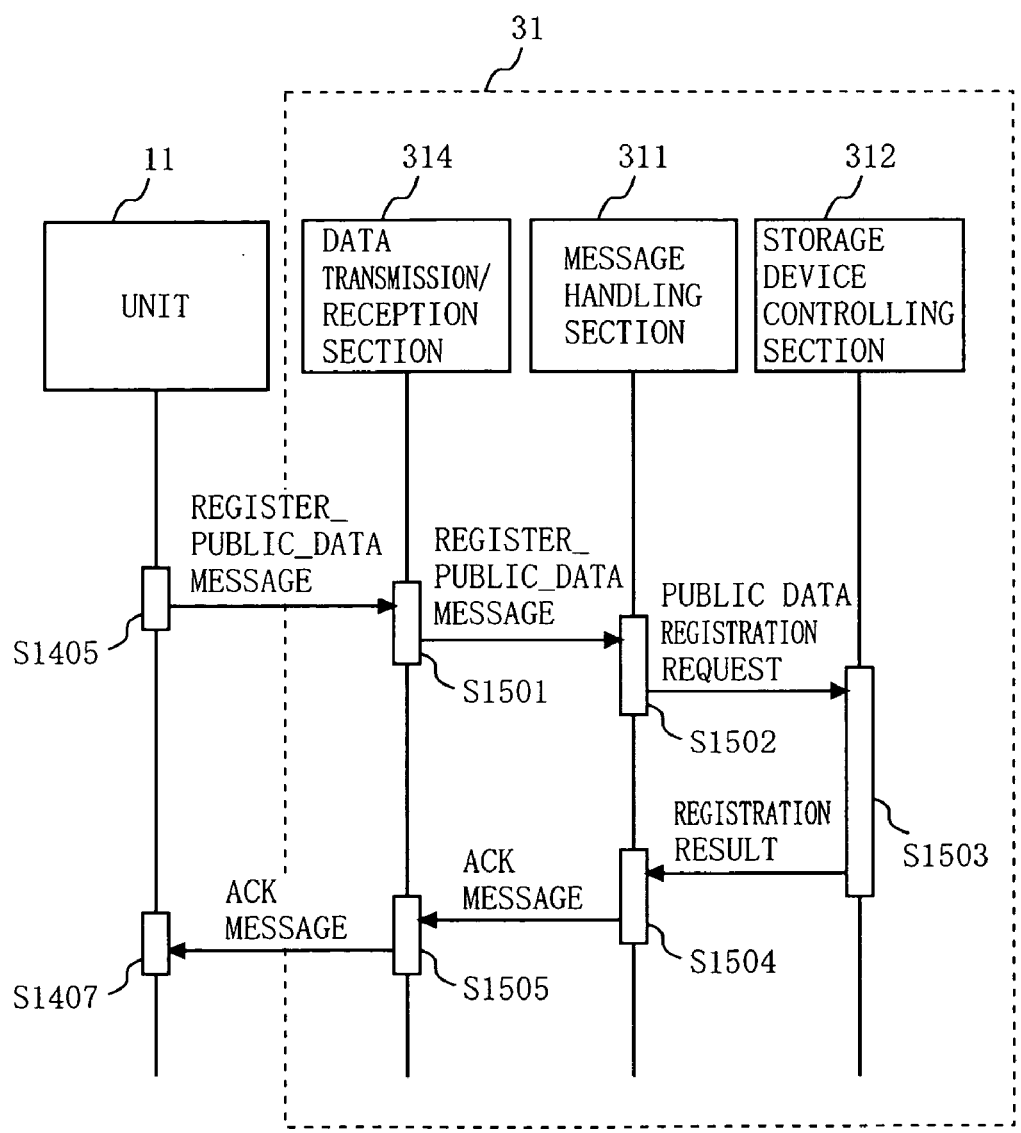
FIG. 15 is a sequence diagram illustrating an operation of the public data keeping device 31 and the unit 11 when the public data keeping device 31 receives a REGISTER_PUBLIC_DATA message.

FIG. 15 is a sequence diagram illustrating an operation of the public data keeping device 31 and the unit 11 when the public data keeping device 31 receives a REGISTER_PUB-LIC_DATA message. In FIG. 15, the same operations as those shown in FIG. 14 will be denoted by the same step numbers and will not be further described below. Note that the sequence diagram of FIG. 15 shows, in greater detail, the operation of the public data keeping device 31 in step S1406 of FIG. 14.

First, the data transmission/reception section 314 of the public data keeping device 31 receives the REGISTER_PUB-LIC_DATA message from the unit 11, and transmits the message to the message handling section 311 (step S1501).

Then, receiving the REGISTER_PUBLIC_DATA message, the message handling section 311 extracts the public data ID, the contents information and the unit ID from the message, and transmits a public data registration request including the extracted information to the storage device controlling section 312 (step S1502).

Receiving the public data registration request, the storage device controlling section 312 produces a public data list in which the public data ID and the contents information included in the request are associated with each other and the public data ID and the unit ID are associated with each other, stores the produced list in the data storage device 313, and transmits the registration result to the message handling section 311 (step S1503).

Receiving the registration result, the message handling section 311 transmits an ACK message including the registration result information to the data transmission/reception section 314 (step S1504). Receiving the ACK message, the data transmission/reception section 314 transmits the message to the unit 11 (step S1505).

Sequence in Unit ID Obtaining Stage

Now, referring to FIG. 16 and FIG. 17, an operation of the unit 11a and the public data keeping device 31 in the stage where the unit 11a obtains, from the public data keeping device 31, a unit ID that is associated with the public data ID specified by the user will be described.

Figure 16:
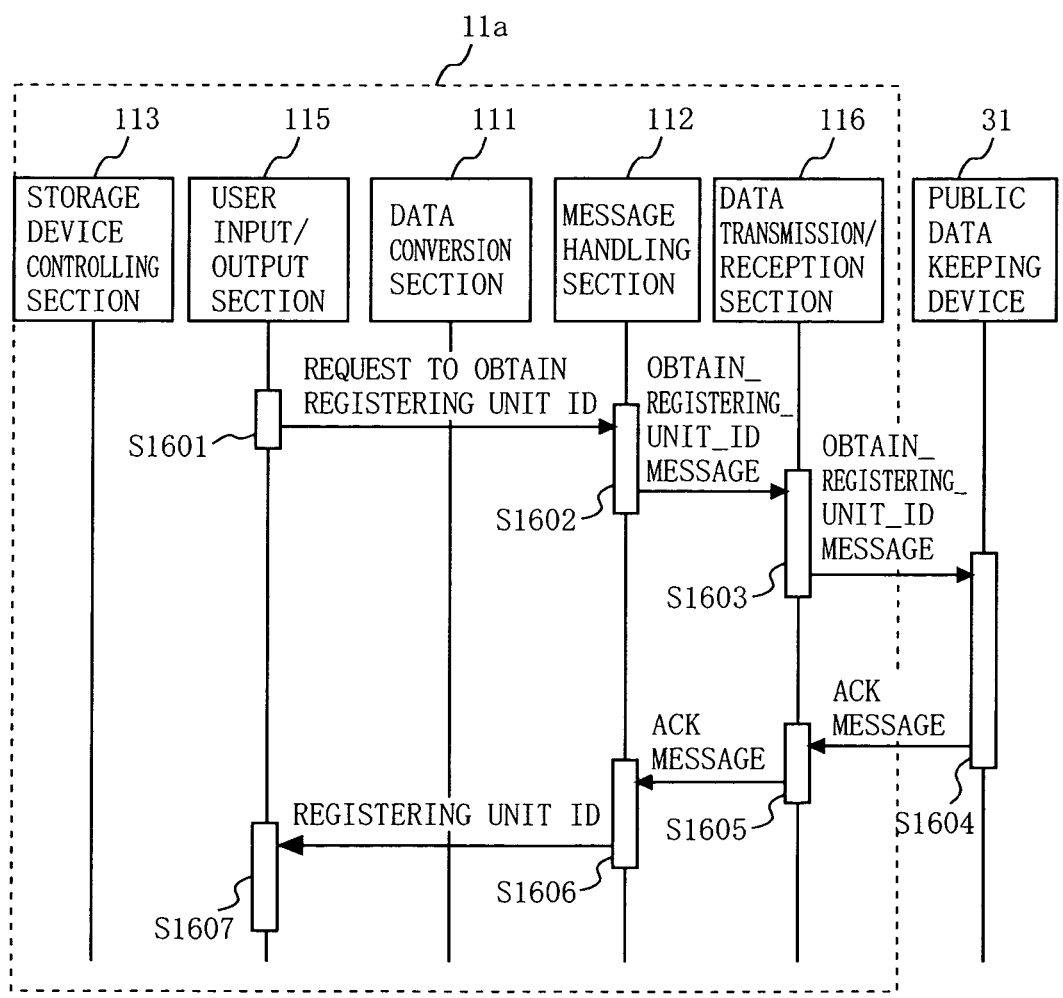
FIG. 16 is a sequence diagram illustrating an operation of a unit 11a when obtaining a unit ID.

FIG. 16 is a sequence diagram illustrating an operation of the unit 11a when obtaining the unit ID. First, the user input/output section 115 of the unit 11a obtains the public data ID of the requested data specified by an input from the user, and transmits a request to obtain a registering unit ID, including the public data ID, to the message handling section 112 (step S1601). It is assumed herein that the public data ID can be obtained from the public data list, etc., made public at the public data keeping device 31. It is assumed herein that the unit 11a obtains a public data ID registered by the unit 11b.

Then, receiving the request to obtain a registering unit ID, the message handling section 112 obtains the public data ID included in the request, produces an OBTAIN_REGISTER-ING_UNIT_ID message including the obtained public data ID, and transmits the produced message to the data transmission/reception section 116 (step S1602).

Receiving the OBTAIN_REGISTERING_UNIT_ID message, the data transmission/reception section 116 transmits the message to the public data keeping device 31 (step S1603).

Receiving the OBTAIN_REGISTERING_UNIT_ID message from the unit 11a, the public data keeping device 31 obtains a registering unit ID that is associated with the public data ID included in the message (the unit ID of the unit 11b in the illustrated example), and transmits an ACK message including the registering unit ID to the unit 11a (step S1604).

Receiving the ACK message from the public data keeping device 31, the data transmission/reception section 116 transmits the message to the message handling section 112 (step S1605). Receiving the ACK message, the message handling section 112 extracts the registering unit ID from the message, and transmits the registering unit ID to the user input/output section 115 (step S1606). The user input/output section 115 uses the received registering unit ID for identifying the unit with which to exchange data.

Figure 17:
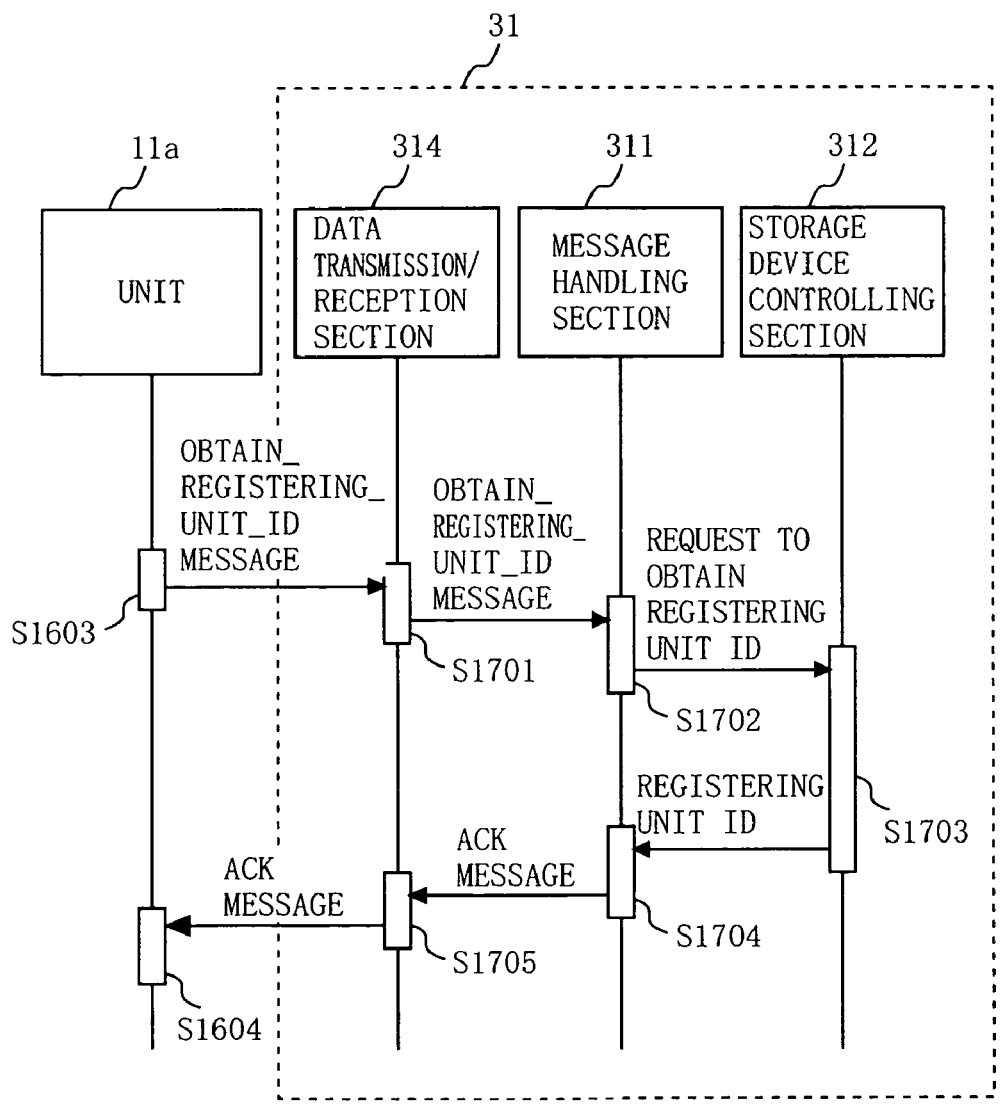
FIG. 17 is a sequence diagram illustrating an operation of the public data keeping device 31 and the unit 11a when the public data keeping device 31 receives an OBTAIN_REGISTERING_UNIT_ID message.

FIG. 17 is a sequence diagram illustrating an operation of the public data keeping device 31 and the unit 11a when the public data keeping device 31 receives an OBTAIN_REGIS-TERING_UNIT_ID message. In FIG. 17, the same operations as those shown in FIG. 16 will be denoted by the same step numbers and will not be further described below. Note that the sequence diagram of FIG. 17 shows, in greater detail, the operation of the public data keeping device 31 in step S1604 of FIG. 16.

First, the data transmission/reception section 314 of the public data keeping device 31 receives an OBTAIN_REGIS-TERING_UNIT_ID message from the unit 11a, and transmits the message to the message handling section 311 (step S1701).

Receiving the OBTAIN_REGISTERING_UNIT_ID message, the message handling section 311 extracts the public data ID from the message, and transmits a request to obtain a registering unit ID, including the extracted ID, to the storage device controlling section 312 (step S1702).

Receiving the request to obtain a registering unit ID, the storage device controlling section 312 obtains a registering unit ID that is associated with the public data ID included in the request from the data storage device 313, and transmits the registering unit ID to the message handling section 311 (step S1703).

Receiving the registering unit ID, the message handling section 311 produces an ACK message including the registering unit ID, and transmits the ACK message to the data transmission/reception section 314 (step S1704).

Receiving the ACK message, the data transmission/reception section 314 transmits the message to the unit 11a (step S1705).

Sequence in Data Exchange Stage

Now, referring to FIG. 18 to FIG. 26, the sequence in the stage where the two units 11a and 11b exchange data therebetween through the mediation of the exchange completion data keeping device 21 will be described.

Figure 18:
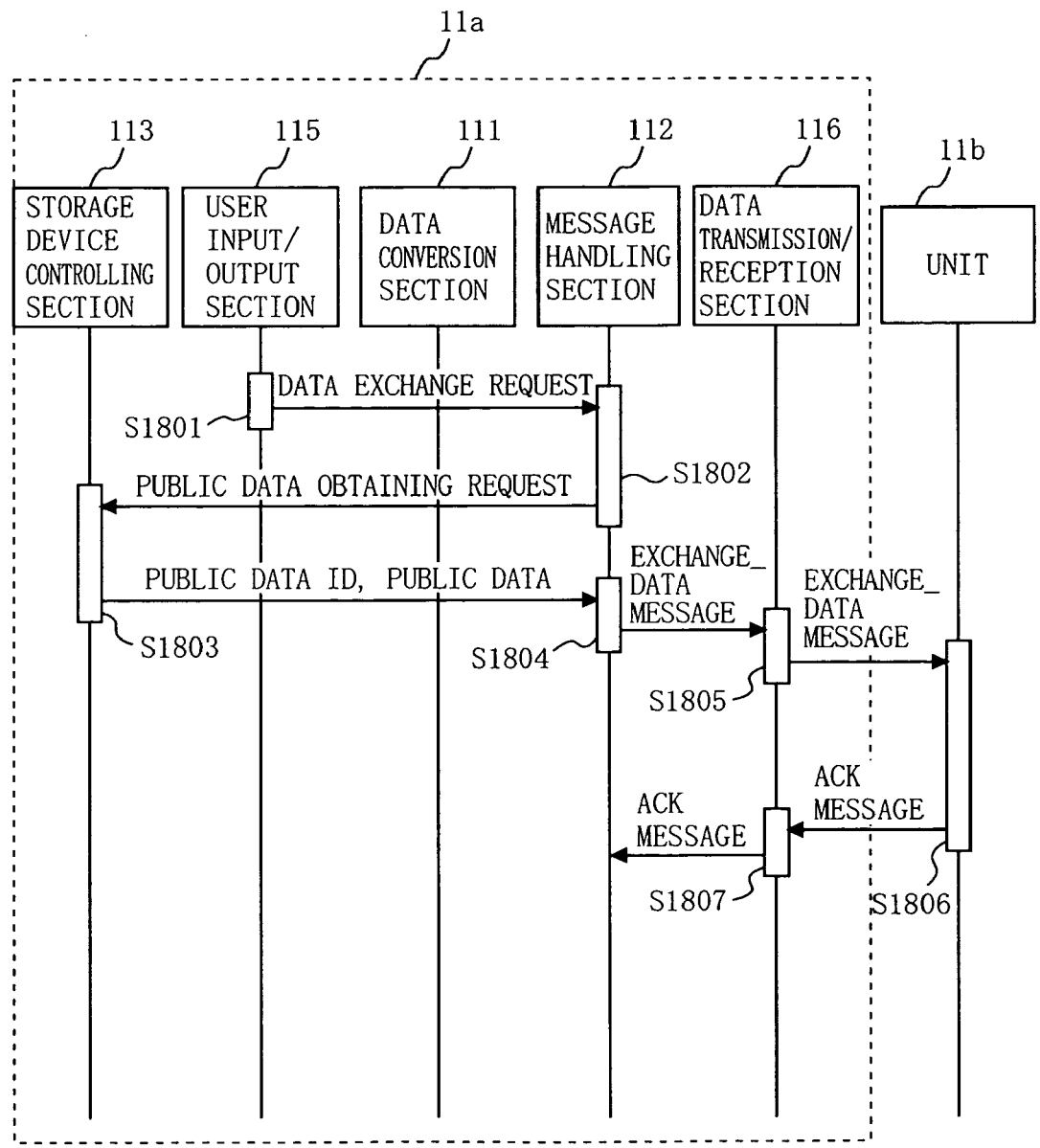
FIG. 18 is a sequence diagram illustrating an operation of the unit 11a and a unit 11b from when the unit 11a requests the unit 11b to exchange data until the unit 11a receives a response thereto.

FIG. 18 is a sequence diagram illustrating an operation of the unit 11a and the unit 11b from when the unit 11a requests the unit 11b to exchange data until the unit 11a receives a response thereto. First, the user input/output section 115 of the unit 11a obtains the public data ID of the data requested by the user and the unit ID of the unit to which the requested data belongs (the unit ID of the unit that has registered the public data ID at the public data keeping device 31), and transmits a data exchange request including the two IDs to the message handling section 112 (step S1801). The process of obtaining the public data ID and the unit ID has been described above with reference to FIG. 16 and FIG. 17.

Receiving the data exchange request, the message handling section 112 transmits, to the storage device controlling section 113, a public data obtaining request to obtain the public data IDs of all the data that the unit 11a has registered at the public data keeping device 31 and all the contents information associated with the public data IDs from the data storage device 114 (step S1802).

Then, receiving the public data obtaining request, the storage device controlling section 113 obtains the public data IDs of all the data that the unit 11a has registered at the public data keeping device 31 and the associated contents information from the data storage device 114, and transmits the obtained information to the message handling section 112 (step S1803).

Then, the message handling section 112 receives the public data IDs and the contents information, and transmits, to the data transmission/reception section 116, an EXCHANGE_DATA message including the received information together with the unit ID and the public data ID obtained in step S1801 (step S1804).

In response to this, the data transmission/reception section 116 transmits the received EXCHANGE_DATA message to the unit 11b (step S1805).

Receiving the EXCHANGE_DATA message from the unit 11a, the unit 11b selects the public data ID of the data requested by the user from the message, and transmits an ACK message including the selected public data ID to the unit 11a, according to the operation shown in FIG. 23 to be described below (step S1806). Note however that if the unit 11b does not have the data requested by the user, the unit 11b transmits an ACK message indicating the absence of the requested data.

Receiving the ACK message from the unit 11b, the data transmission/reception section 116 transmits the message to the message handling section 112 (step S1807).

Figure 19:
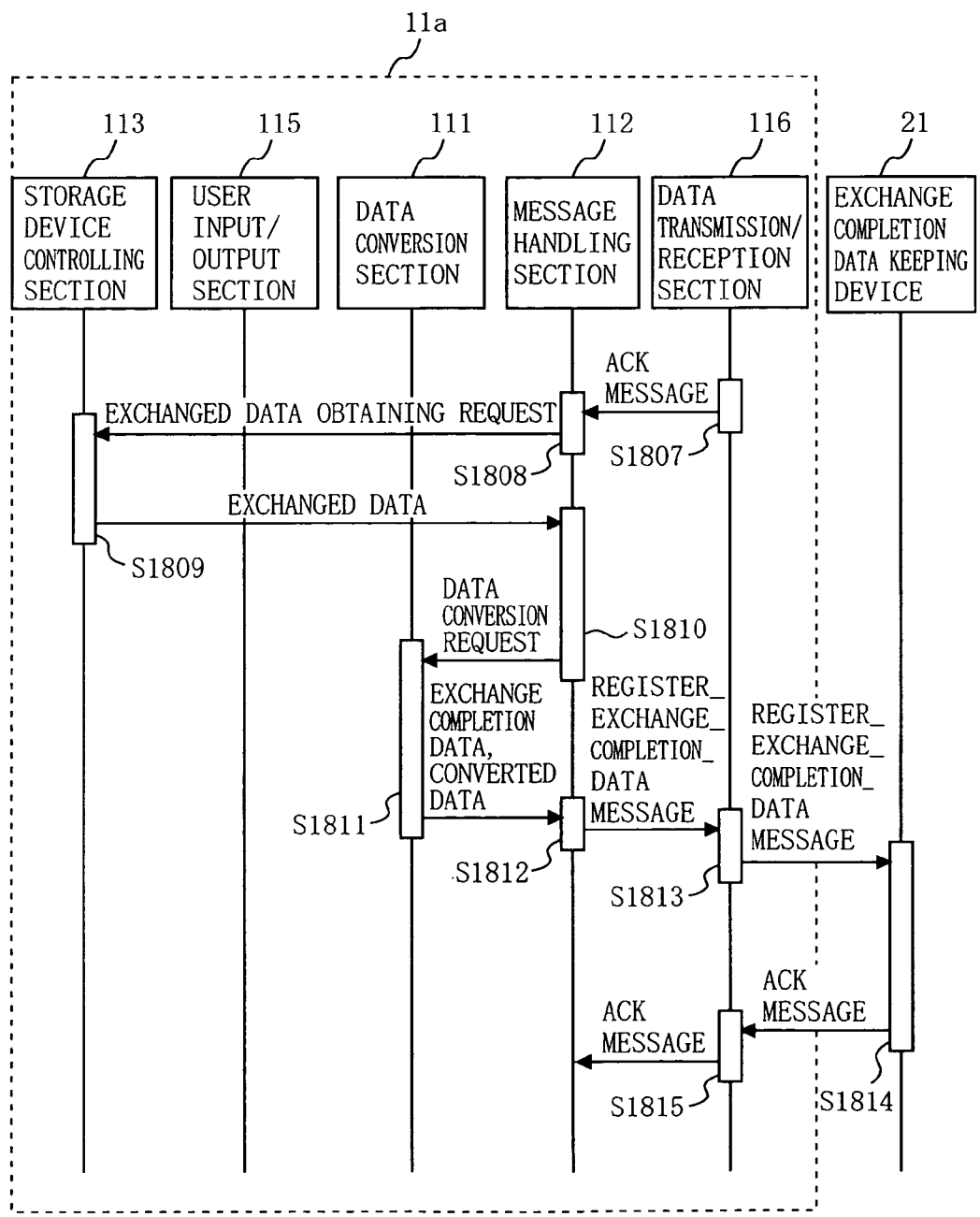

FIG. 19 is a sequence diagram illustrating an operation of the unit 11a and the exchange completion data keeping device 21 from when the unit 11a requests the exchange completion data keeping device 21 for mediation until the unit 11a receives a response thereto in a case where an ACK message received from the unit 11b includes a public data ID of data requested by the unit 11a. In FIG. 19, the same operations as those shown in FIG. 18 will be denoted by the same step numbers and will not be further described below.

The message handling section 112 receives an ACK message, and determines whether or not the exchanged data ID is included in the ACK message. If it is included, the message handling section 112 transmits an exchanged data obtaining request including the exchanged data ID to the storage device controlling section 113 (step S1808). If it is not included, the message handling section 112 transmits information indicating the absence thereof to the user input/output section 115. In response to this, the user input/output section 115 notifies the user that the data exchange has been refused by the unit 11b.

Next, receiving the exchanged data obtaining request, the storage device controlling section 113 references the data storage device 114 to obtain the data ID associated with the exchanged data ID included in the request and obtain data that is associated with the data ID, and transmits the obtained data (hereinafter referred to as the "exchanged data") to the message handling section 112 (step S1809).

Receiving the exchanged data, the message handling section 112 transmits the exchanged data to the data conversion section 111, and issues a request to convert the exchanged data to obtain converted data (hereinafter referred to as the "data conversion request") (step S1810).

Receiving the data conversion request, the data conversion section 111 converts the unconverted data included in the request to produce the converted data and the exchange completion data, and transmits the converted data and the exchange completion data to the message handling section 112 (step S1811).

Then, receiving the converted data and the exchange completion data, the message handling section 112 produces a REGISTER_EXCHANGE_COMPLETION_DATA message including the exchange completion data and the unit ID, and transmits the produced message to the data transmission/reception section 116 (step S1812).

Receiving the REGISTER_EXCHANGE_COMPLETION_DATA message, the data transmission/reception section 116 transmits the message to the exchange completion data keeping device 21 (step S1813).

Note that although the operation of the unit 11b will not be described herein, the unit 11b performs a similar operation to that of the unit 11a to transmit exchange completion data to the exchange completion data keeping device 21.

Receiving the REGISTER_EXCHANGE_COMPLETION_DATA message from the unit 11a and from the unit 11b, the exchange completion data keeping device 21 produces a determination table and stores therein the exchange completion data included in the received message, and then transmits an ACK message including the determination table ID to the unit 11a and the unit 11b, according to the operation shown in FIG. 24 to be described below (step S1814).

Then, receiving the ACK message from the exchange completion data keeping device 21, the data transmission/reception section 116 of the unit 11a transmits the message to the message handling section 112 (step S1815).

Figure 20:
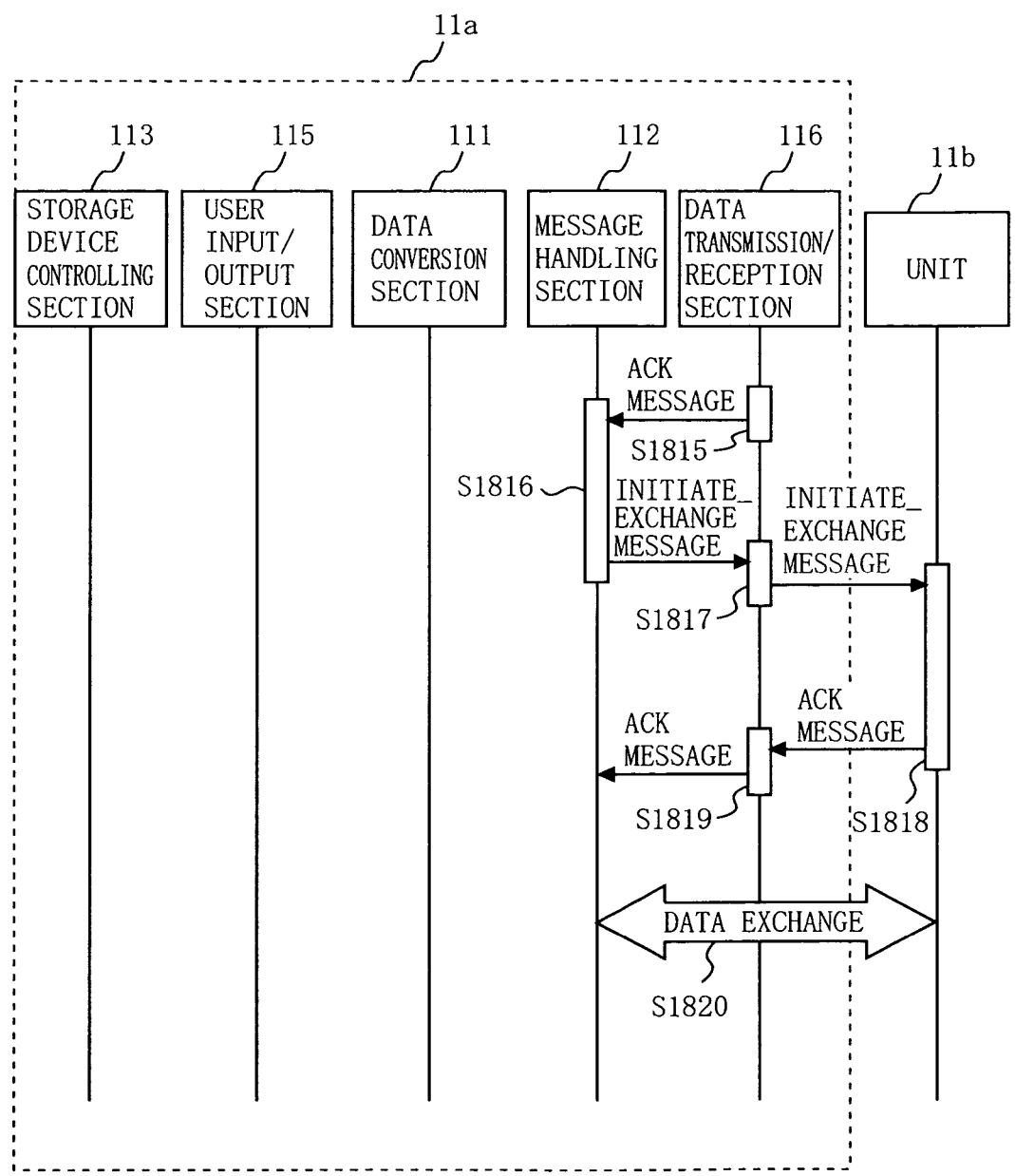
FIG. 20 is a sequence diagram illustrating an operation of the unit 11a and the unit 11b from when the unit 11a receives an ACK message from the exchange completion data keeping device 21 until the unit 11a starts a data exchange with the unit 11b.

FIG. 20 is a sequence diagram illustrating an operation of the unit 11a and the unit 11b from when the unit 11a receives an ACK message from the exchange completion data keeping device 21 until the unit 11a starts a data exchange with the unit 11b. In FIG. 20, the same operations as those shown in FIG. 19 will be denoted by the same step numbers and will not be further described below.

First, receiving the ACK message, the message handling section 112 of the unit 11a transmits an INITIATE_EXCHANGE message to the data transmission/reception section 116 (step S1816).

Then, receiving the INITIATE_EXCHANGE message, the data transmission/reception section 116 transmits the message to the unit 11b (step S1817).

Receiving the INITIATE_EXCHANGE message from the unit 11a, the unit 11b produces an ACK message and transmits the message to the unit 11a, according to the operation shown in FIG. 25 to be described below (step S1818).

Receiving the ACK message from the unit 11b, the data transmission/reception section 116 of the unit 11a transmits the message to the message handling section 112 (step S1819).

Then, the data exchange is initiated between the unit 11a and the unit 11b (step S1820). The communications method used for the data exchange may be a method well known in the art such as a packet-based communications method.

Figure 21:
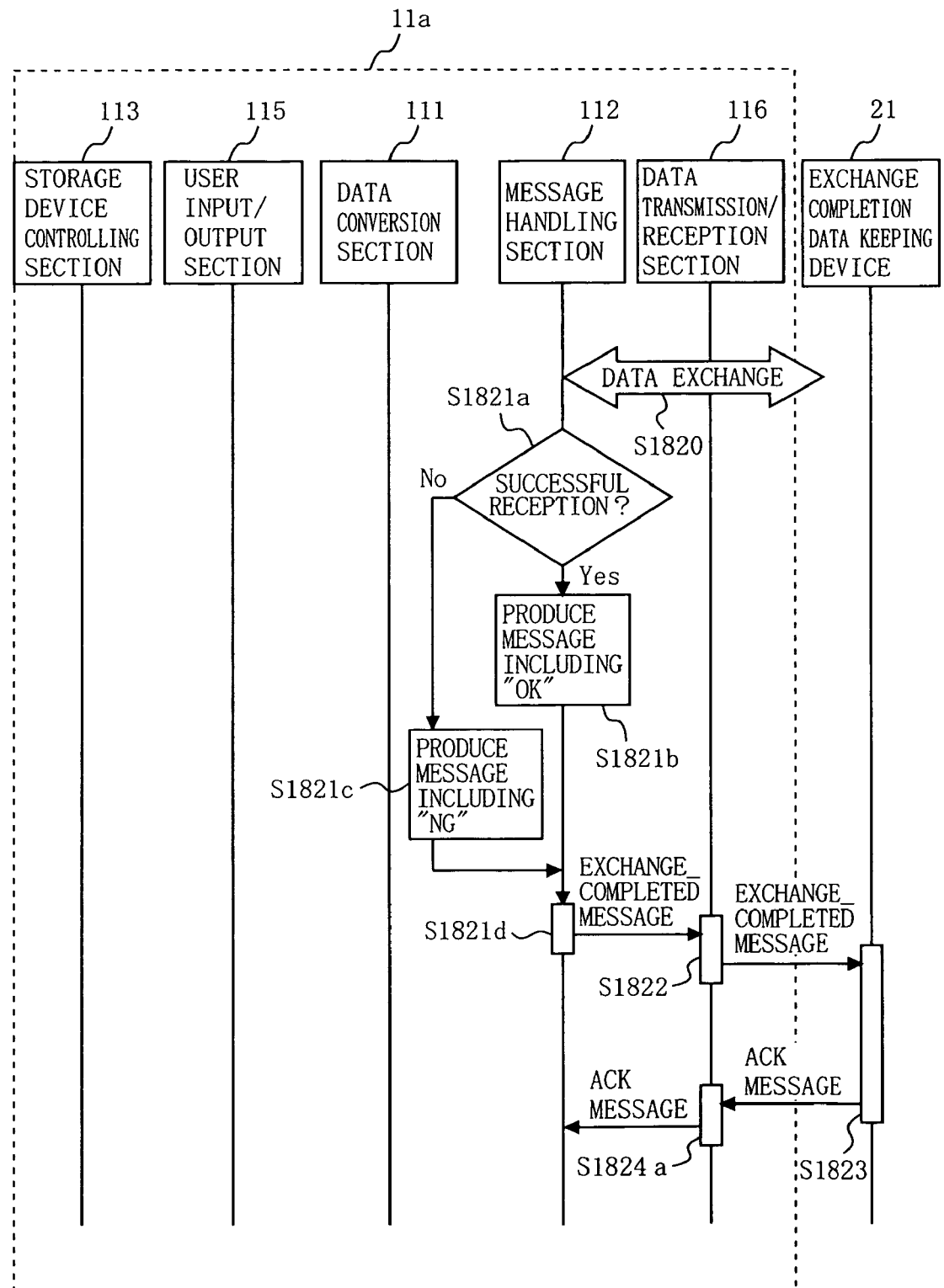
FIG. 21 is a sequence diagram illustrating an operation of the unit 11a and the exchange completion data keeping device 21 from when the unit 11a terminates the communication session with the unit 11b until the unit 11a receives an ACK message from the exchange completion data keeping device 21.

FIG. 21 is a sequence diagram illustrating an operation of the unit 11a and the exchange completion data keeping device 21 from when the unit 11a terminates the communication session with the unit 11b until the unit 11a receives an ACK message from the exchange completion data keeping device 21. In FIG. 21, the same operations as those shown in FIG. 20 will be denoted by the same step numbers and will not be further described below.

First, when the communication session with the unit 11b is terminated, the message handling section 112 determines whether or not the exchanged data of interest has been obtained successfully from the unit 11b (step S1821a). The determination of whether or not each unit has obtained data successfully can be made as follows. The units 11a and 11b may previously exchange sizes of data to be transmitted to each other, and each unit can determine that the exchanged data could not be received successfully if the size of the received data is smaller than the scheduled data size.

If the data has been obtained successfully, the message handling section 112 produces an EXCHANGE_COMPLETED message including information that indicates the completion of the exchange (hereinafter referred to as the "OK information") and the determination table ID (step S1821b). If the data has not been obtained successfully, the message handling section 112 produces an EXCHANGE_COMPLETED message including information that indicates the failure of the exchange (hereinafter referred to as the "NG information") and the determination table ID (step 51821c). Then, the message handling section 112 transmits the produced EXCHANGE_COMPLETED message to the data transmission/reception section 116 (step S1821d).

Receiving the EXCHANGE_COMPLETED message, the data transmission/reception section 116 transmits the message to the exchange completion data keeping device 21 (step S1822). Note that although the operation of the unit 11b will not be described herein, the unit 11b performs a similar operation to that of the unit 11a to transmit an EXCHANGE_COMPLETED message to the exchange completion data keeping device 21.

Receiving the EXCHANGE_COMPLETED message from the unit 11a and from the unit 11b, the exchange completion data keeping device 21 determines whether or not to send exchange completion data needed by the unit 11a and exchange completion data needed by the unit 11b to the unit 11a and the unit 11b, respectively, based on the determination table, according to the operation shown in FIG. 26 to be described below. If it is determined that the exchange completion data is to be transmitted, the exchange completion data keeping device 21 transmits an ACK message including the exchange completion data to the unit 11a and the unit 11b. If it is determined that the exchange completion data is not to be transmitted, the exchange completion data keeping device 21 transmits an ACK message that does not include the exchange completion data to the unit 11a and the unit 11b (step S1823). The determination of whether or not to transmit the exchange completion data will be described below in detail with reference to FIG. 26.

The data transmission/reception section 116 transmits the ACK message from the exchange completion data keeping device 21 to the message handling section 112 (step S1824a).

FIG. 22 is a sequence diagram illustrating an operation of the unit 11a after receiving the ACK message from the exchange completion data keeping device 21. In FIG. 22, the same operations as those shown in FIG. 21 will be denoted by the same step numbers and will not be further described below.

First, the message handling section 112 analyzes the ACK message from the exchange completion data keeping device 21 to determine whether or not exchange completion data is included therein (step S1825a). If it is not included, the message handling section 112 transmits information indicating the absence thereof to the user input/output section 115. Then, since the exchange completion data could not be obtained, the message handling section 112 notifies the user that the exchanged data cannot be reproduced (step S1825b).

If it is included, the message handling section 112 extracts the exchange completion data, and transmits a data conversion request including the exchange completion data and the converted data obtained from the unit 11b to the data conversion section 111 (step S1825c).

Receiving the data conversion request, the data conversion section 111 produces unconverted data based on the exchange completion data and the converted data included in the request, and transmits the unconverted data to the message handling section 112 (step S1826).

Then, receiving the unconverted data, the message handling section 112 transmits a data registration request including the unconverted data to the storage device controlling section 113 (step S1827). Receiving the data registration request, the storage device controlling section 113 extracts data included in the request, newly assigns a data ID to the extracted data, registers the extracted data at the data storage device 114, and transmits information indicating the registration result to the message handling section 112 (step S1828).

Then, receiving the information indicating the registration result, the message handling section 112 transmits information indicating the completion of the exchange to the user input/output section 115 (step S1829). Finally, the user input/output section 115 notifies the user of the completion of the data exchange (step S1830).

Figure 23:
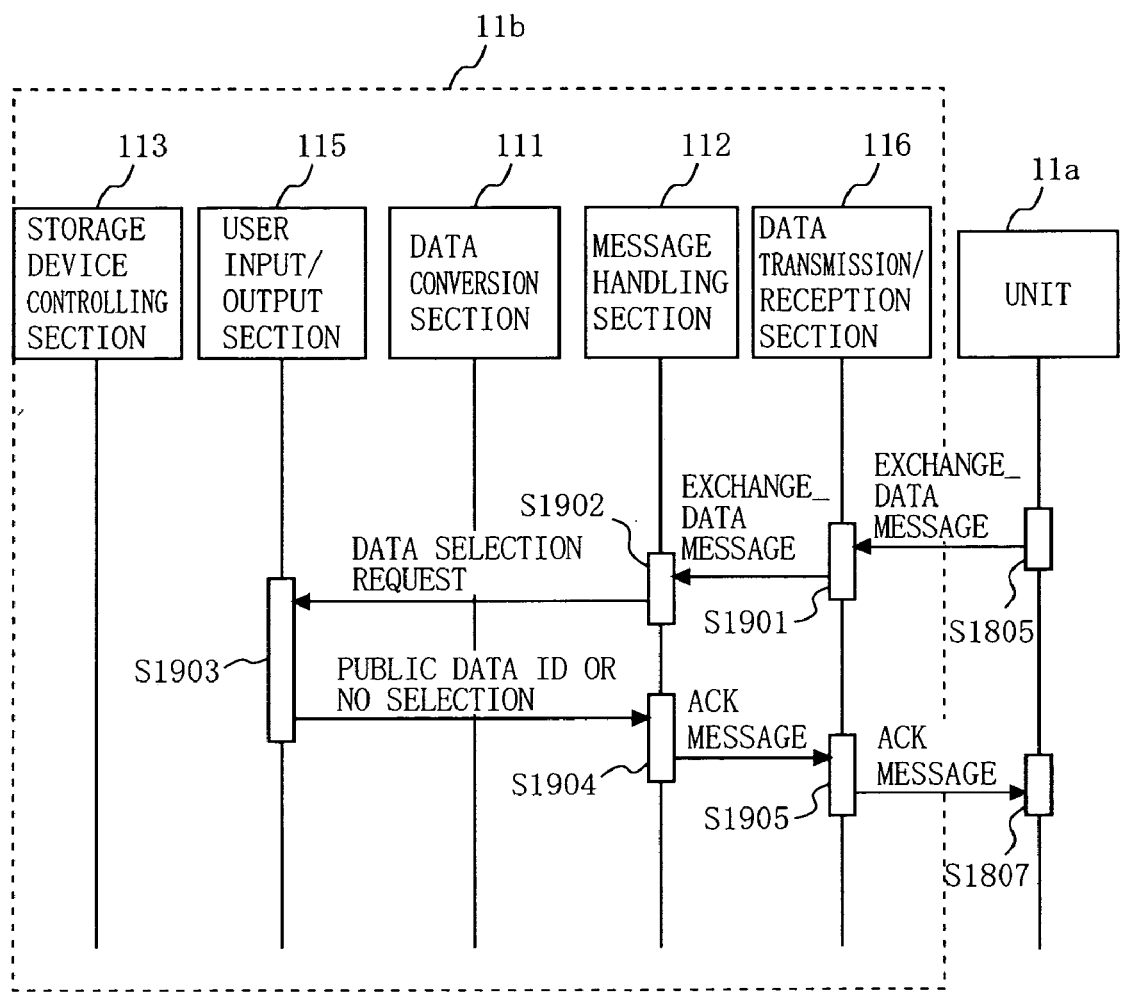

FIG. 23 is a sequence diagram illustrating an operation of the unit 11b when the unit 11b receives an EXCHANGE_DATA message from the unit 11a. In FIG. 23, the same operations as those shown in FIG. 18 will be denoted by the same step numbers and will not be further described below. FIG. 23 shows, in greater detail, the operation of the unit 11b in step S1806 of FIG. 18.

Receiving the EXCHANGE_DATA message from the unit 11a, the data transmission/reception section 116 of the unit 11b transmits the message to the message handling section 112 (step S1901).

Then, receiving the EXCHANGE_DATA message, the message handling section 112 extracts all the public data IDs and the associated contents information from the message, and transmits a data selection request including the extracted information to the user input/output section 115 (step S1902).

Receiving the data selection request, the user input/output section 115 presents all the public data IDs and the associated contents information in the request to the user, and allows the user to select data of interest to the user. In response to this, the user selects data of interest from among the presented public data. If there is no particular data of interest to the user, the user makes a selection indicating the absence of data of interest. The user input/output section 115 transmits the public data ID that is associated with the public data selected by the user to the message handling section 112 (step S1903). Note that if no particular data of interest is selected, the user input/output section 115 transmits information indicating the absence of data of interest to the message handling section 112 in place of the public data ID.

Receiving the public data ID or the information indicating that no data has been selected, the message handling section 112 transmits an ACK message including such information to the data transmission/reception section 116 (step S1904). Receiving the ACK message, the data transmission/reception section 116 transmits the message to the unit 11a (step S1905).

Figure 24:
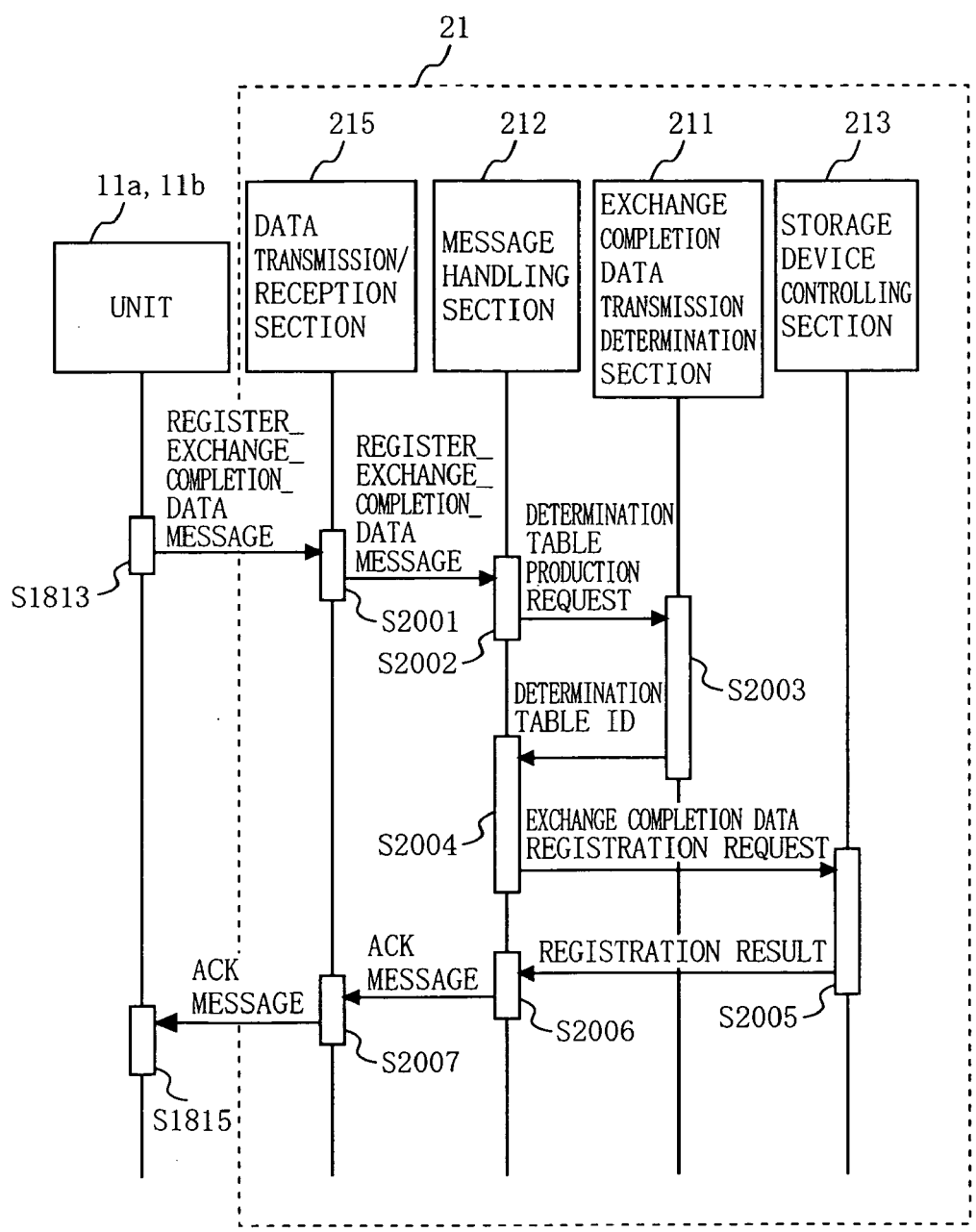
FIG. 24 is a sequence diagram illustrating an operation of the exchange completion data keeping device 21 when the exchange completion data keeping device 21 receives a REGISTER_EXCHANGE_COMPLETION_DATA message from the unit 11a and from the unit 11b.

FIG. 24 is a sequence diagram illustrating an operation of the exchange completion data keeping device 21 when the exchange completion data keeping device 21 receives a REGISTER_EXCHANGE_COMPLETION_DATA message from the unit 11a and from the unit 11b. In FIG. 24, the same operations as those shown in FIG. 19 will be denoted by the same step numbers and will not be further described below. FIG. 24 shows, in greater detail, the operation of the exchange completion data keeping device 21 in step S1814 of FIG. 19.

Receiving the REGISTER_EXCHANGE_COMPLETION_DATA message from the unit 11a and from the unit 11b, the data transmission/reception section 215 of the exchange completion data keeping device 21 transmits the message to the message handling section 212 (step S2001).

Receiving the REGISTER_EXCHANGE_COMPLETION_DATA message, the message handling section 212 transmits, to the exchange completion data transmission determination section 211, a request to produce a determination table including the exchange completion data ID and the unit ID included in the message (step S2002).

Receiving the determination table production request, the exchange completion data transmission determination section 211 produces a determination table in which the unit ID and the exchange completion data ID included in the request are associated with each other, and transmits the determination table ID of the determination table to the message handling section 212 (step S2003).

Receiving the determination table ID, the message handling section 212 extracts the exchange completion data and the exchange completion data ID from the REGISTER_EXCHANGE_COMPLETION_DATA message received from the unit 11a and from the unit 11b, and transmits an exchange completion data registration request including the extracted information to the storage device controlling section 213 (step S2004).

Then, receiving the exchange completion data registration request, the storage device controlling section 213 stores the exchange completion data and the exchange completion data ID included in the request in the data storage device 214 so that they are associated with each other, and transmits information indicating the registration result to the message handling section 212 (step S2005).

Receiving the information indicating the registration result, the message handling section 212 transmits an ACK message including the determination table ID to the data transmission/reception section 215 (step S2006). Receiving the ACK message, the data transmission/reception section 215 transmits the message to the unit 11a and the unit 11b (step S2007).

Figure 25:
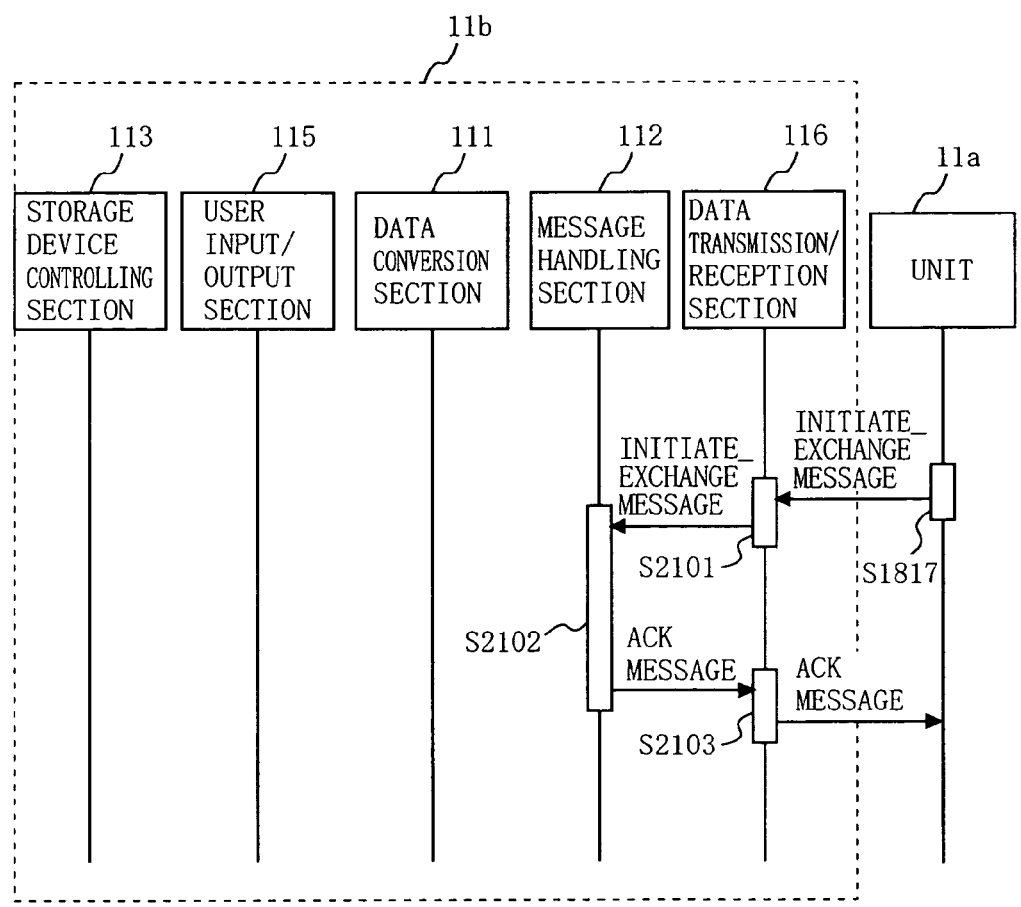

FIG. 25 is a sequence diagram illustrating an operation of the unit 11b when the unit 11b receives an INITIATE_EXCHANGE message from the unit 11a. In FIG. 25, the same operations as those shown in FIG. 20 will be denoted by the same step numbers and will not be further described below. FIG. 25 shows, in greater detail, the operation of the unit 11b in step S1818 of FIG. 20.

Receiving the INITIATE_EXCHANGE message from the unit 11a, the data transmission/reception section 116 of the unit 11b transmits the message to the message handling section 112 (step S2101). Receiving the INITIATE_EXCHANGE message, the message handling section 112 checks what are being exchanged, and transmits an ACK message to the data transmission/reception section 116 (step S2102). Receiving the ACK message, the data transmission/reception section 116 transmits the message to the unit 11a (step S2103).

Figure 26:
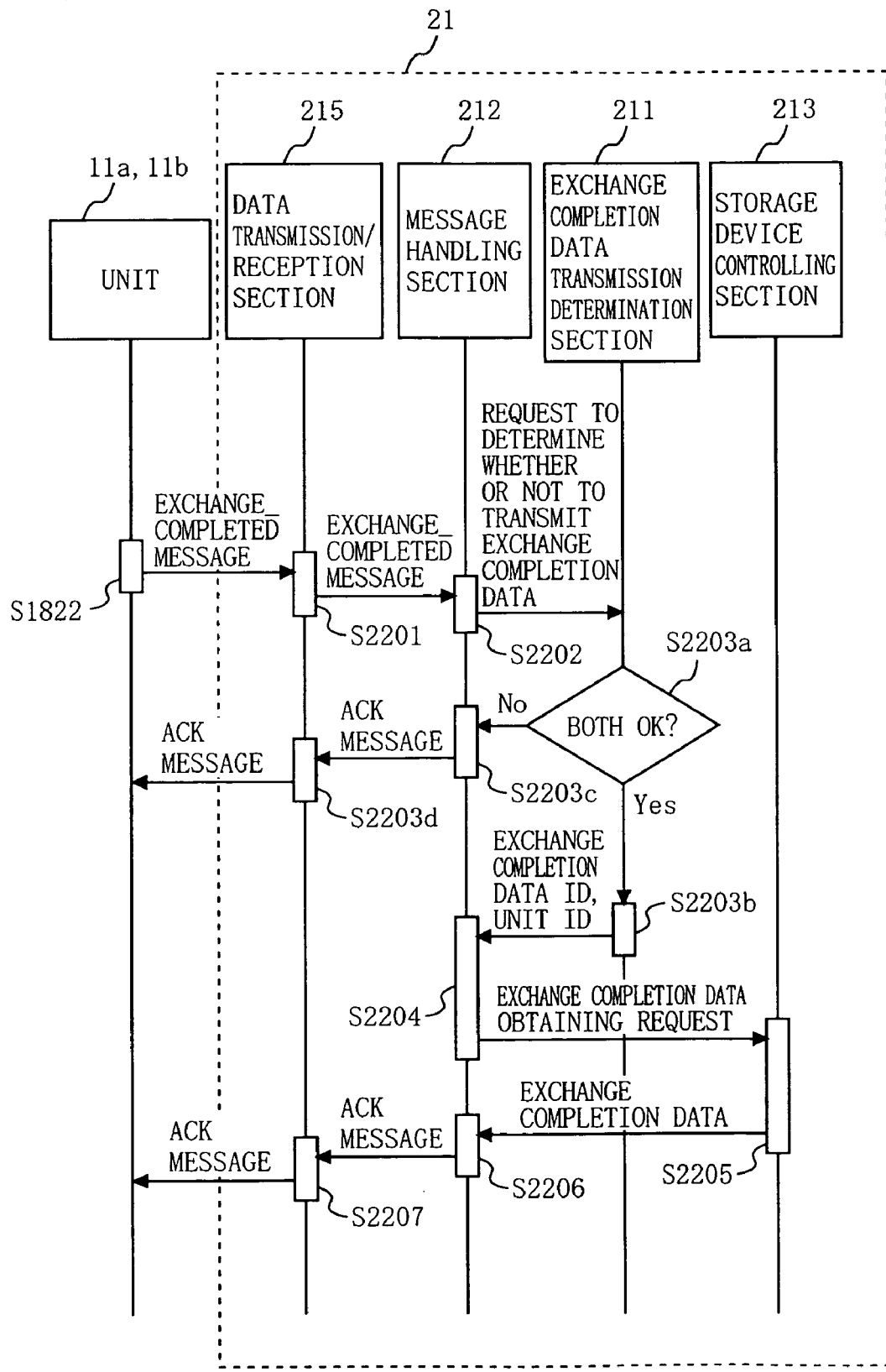
FIG. 26 is a sequence diagram illustrating an operation of the exchange completion data keeping device 21 when the exchange completion data keeping device 21 receives an EXCHANGE_COMPLETED message from the unit 11a and from the unit 11b.

FIG. 26 is a sequence diagram illustrating an operation of the exchange completion data keeping device 21 when the exchange completion data keeping device 21 receives an EXCHANGE_COMPLETED message from the unit 11a and from the unit 11b. In FIG. 26, the same operations as those shown in FIG. 21 will be denoted by the same step numbers and will not be further described below. FIG. 26 shows, in greater detail, the operation of the exchange completion data keeping device 21 in step S1823 of FIG. 21.

Receiving the EXCHANGE_COMPLETED message from the unit 11a and from the unit 11b, the data transmission/reception section 215 of the exchange completion data keeping device 21 transmits the message to the message handling section 212 (step S2201).

Receiving the EXCHANGE_COMPLETED message from the unit 11a and from the unit 11b, the message handling section 212 extracts, from each of the messages, the determination table ID, the exchange completion information (the OK information indicating completion of the exchange or the NG information indicating failure of the exchange) and the unit ID, registers the extracted information in the determination table, and requests the exchange completion data transmission determination section 211 to determine whether or not to transmit the exchange completion data to the units 11a and 11b while specifying a determination table ID of the determination table (step S2202).

Receiving the request to determine whether or not to transmit the exchange completion data, the exchange completion data transmission determination section 211 references the determination table associated with the determination table ID included in the request to determine whether or not the OK information is registered in both of the completion notification flags of the unit IDs of the unit 11a and the unit 11b (step S2203a). If the OK information is registered for both units, the exchange completion data transmission determination section 211 transmits the unit IDs and the associated exchange completion data ID to the message handling section 212 and requests the message handling section 212 to transmit the exchange completion data associated with the unit ID of the unit 11b to the unit 11a and to transmit the exchange completion data associated with the unit ID of the unit 11a to the unit 11b (step S2203b). If the NG information is registered for either unit in the determination table, the exchange completion data transmission determination section 211 transmits, to the message handling section 212, information indicating that the exchange completion data cannot be transmitted, and the message handling section 212 in response transmits, to the unit 11a and the unit 11b, an ACK message that indicates that the exchange completion data cannot be obtained (steps S2203c and S2203d).

Receiving the unit ID and the exchange completion data ID, the message handling section 212 transmits the exchange completion data ID to the storage device controlling section 213 and requests the storage device controlling section 213 to obtain the associated exchange completion data from the data storage device 214 (hereinafter referred to as the "exchange completion data obtaining request") (step S2204).

Receiving the exchange completion data obtaining request, the storage device controlling section 213 obtains exchange completion data that is associated with the exchange completion data ID included in the request from the data storage device 214, and transmits the obtained exchange completion data to the message handling section 212 (step S2205).

Receiving the exchange completion data, the message handling section 212 transmits, to the data transmission/reception section 215, ACK messages each including the exchange completion data such that the exchange completion data associated with the unit ID of the unit 11b is transmitted to the unit 11a and the exchange completion data associated with the unit ID of the unit 11a is transmitted to the unit 11b (step S2206). Receiving the ACK messages, the data transmission/reception section 215 transmits one of the messages to the unit 11a and the other to the unit 11b as specified (step S2207).

Thus, in the first embodiment, the data to be exchanged between units will not themselves be uploaded to the exchange completion data keeping device, but only the data (the exchange completion data) that is necessary for completing the data exchange is uploaded to the exchange completion data keeping device. This reduces the problem that the communications cost and the load on the mediator server increase in proportion to the amount of data exchanged between units. In addition, two units exchanging data with each other can obtain the exchange completion data only when both of the units have successfully received data of interest. Therefore, in the case of an abnormal termination of the communication session, e.g., in the case of disconnection on the side of one unit whereby the other unit fail to successfully receive the data of interest, one of the units that has terminated the communication session cannot obtain the exchange completion data. Then, neither of the units will be able to reproduce the data of interest. Thus, a fair data exchange system is realized.

Moreover, the exchange completion data is produced by each unit, thereby further reducing the load on the exchange completion data keeping device. Each unit transmits its data to the other party's unit after converting it to data that cannot be reproduced successfully without the use of exchange completion data. Therefore, the other party's unit cannot successfully reproduce the data unless it obtains the exchange completion data.

For example, a unit may encrypt data and transmit the encrypted data to the other party's unit, and received data can be reproduced by using a decryption key as encrypted exchange completion data. Then, it is possible to easily realize the system of the present invention by employing commonly-available encryption/decryption software.

The exchange completion data keeping device determines whether or not each unit exchanging its data with another has successfully received data based on the communication result sent from the unit. Therefore, it is possible to easily determine whether or not the data exchange has been performed successfully.

The program of the present invention can be distributed to each party's computer device to realize an easy-to-use unit-to-unit data exchange system, thus facilitating the circulation of information contents.

Note that the operation of each of the unit 11, the exchange completion data keeping device 21 and the public data keeping device 31 illustrated in the first embodiment can be implemented by a program to be run by a general-purpose computer device. Such a program is stored in a non-transitory computer-readable recording medium such as a hard disk, an optical disk, a CD-ROM, a memory, or the like, and is run by a CPU, or the like.

Note that while each unit produces and transmits the exchange completion data to the exchange completion data keeping device in the first embodiment, the exchange completion data keeping device may produce the exchange completion data. A system where the exchange completion data keeping device produces the exchange completion data will now be described. For example, where a decryption key is used as the exchange completion data, each unit wishing to exchange data with another unit requests the exchange completion data keeping device to produce a decryption key. In response to this, the exchange completion data keeping device produces a decryption key and a corresponding encryption key. The exchange completion data keeping device registers, in the determination table, the requesting unit that has made the request to produce the decryption key so that it can later be identified. Then, the exchange completion data keeping device transmits the produced encryption key to the requesting unit. Receiving the encryption key, the unit encrypts the data to be exchanged using the encryption key to produce the converted data. The converted data can be decrypted by using the decryption key registered in the exchange completion data. The unit transmits the converted data, which has been encrypted, to the other party's unit, and obtains data of interest from the other party's unit. Thereafter, as in the embodiment described above, the unit obtains the decryption key from the exchange completion data keeping device to recover and reproduce the converted data that it has received from the other party's unit. Thus, where the exchange completion data keeping device produces the decryption key, the exchange completion data keeping device produces the encryption key corresponding to the decryption key at the same time, and returns the encryption key to the unit that has made the request to produce the decryption key. The encryption key can be said to be data used for converting the unconverted data (hereinafter referred to as the "conversion process data") so that the converted data can be reproduced successfully by using the decryption key. Also in this case, the exchange completion data may alternatively be something other than a decryption key. Moreover, the conversion process data may alternatively be something other than an encryption key. Furthermore, in the system where the exchange completion data is produced by the exchange completion data keeping device, the unit and the exchange completion data keeping device may be each implemented by a program instructing a computer device to perform operations as described above. Thus, if the exchange completion data keeping device produces the exchange completion data, the unit does not have to have means for producing the exchange completion data, whereby it is possible to reduce the load on the unit. This is advantageous where units with small processing capacities are used.

In the first embodiment, the units previously exchange sizes of data to be transmitted to each other, and each unit can determine that the exchanged data could not be received successfully if the size of the received data is smaller than the scheduled data size. However, the method for determining whether or not the exchanged data has been received successfully is not limited to this. For example, each unit may calculate the hash value of the converted data, and register the hash value at the exchange completion data keeping device 21, together with the exchange completion data. Then, each unit, after finishing the communication session with the other unit, can calculate the hash value of the received data and transmits the hash value to the exchange completion data keeping device 21. In response to this, the exchange completion data keeping device 21 compares the received hash value with the registered hash value. The exchange completion data keeping device 21 determines that the data exchange has been performed successfully if the hash values match with each other, and that the data exchange has not been performed successfully if the hash values do not match with each other. The use of a hash value is advantageous in that it can be determined that the data exchange has been performed successfully even if a portion of the exchanged data is lost along the channel, whereby the size of the received data is less than the scheduled size but the obtained exchanged data can still be reproduced. It is understood that the present invention is not limited to what has been described above, as long as each unit sends the communication result with which the exchange completion data keeping section can determine whether or not the data exchange has been performed successfully.

In the first embodiment, each unit transmits the NG information to the exchange completion data keeping device if the exchanged data has not been received successfully. However, it is not necessary to transmit the NG information if the exchange completion data keeping section transmits the exchange completion data only when the OK information is received from both of the two units.

Figure 27:
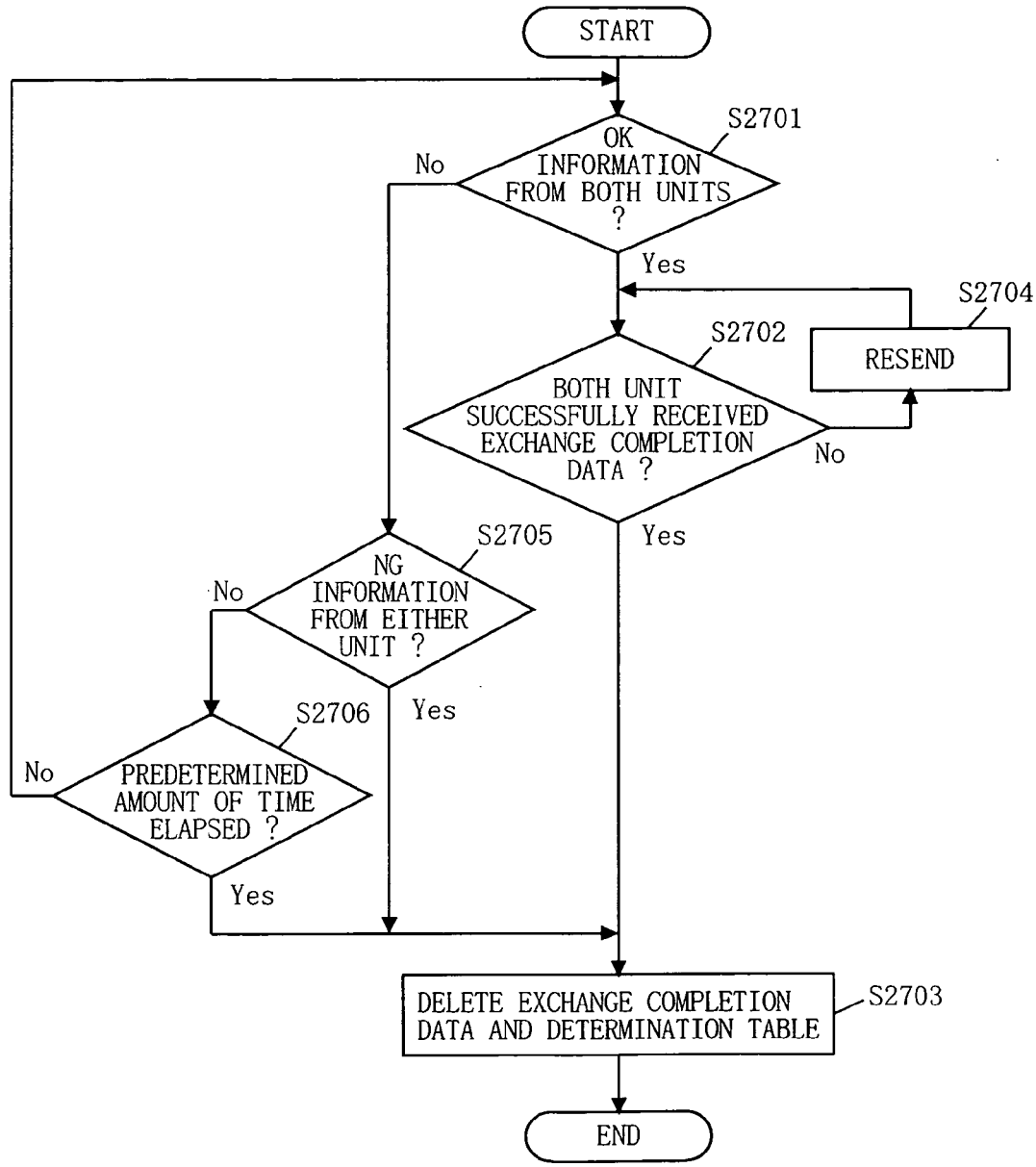
FIG. 27 is a flow chart illustrating an operation of the exchange completion data keeping device 21 until exchange completion data is deleted.

The process of deleting the exchange completion data stored in the exchange completion data keeping device 21 will now be described. FIG. 27 is a flow chart illustrating an operation of the exchange completion data keeping device 21 until exchange completion data is deleted. The operation illustrated in FIG. 27 is performed after the exchange completion data keeping device 21 transmits the ACK message in FIG. 26.

First, the exchange completion data keeping device 21 references the determination table to determine whether or not the OK information has been transmitted from both of the two units 11a and 11b exchanging data with each other (step S2701). If the OK information has been transmitted from both of the units, the exchange completion data keeping device 21 determines whether or not the ACK message, indicating that the exchange completion data has been obtained successfully, has been received from both of the units 11a and 11b (step S2702).

If so, indicating that the exchange completion data has been received successfully by both of the units 11a and 11b, the exchange completion data keeping device 21 deletes the stored exchange completion data and the associated determination table (step S2703), and exits the process. If not, indicating that the exchange completion data has not successfully reached the unit or units due to a communications abnormality, etc., the exchange completion data keeping device 21 resends the exchange completion data to the unit that has transmitted the ACK message indicating the failure to successfully obtain the exchange completion data (step S2704), and the process returns to step S2702.

If the OK information has not been received from both of the units in step S2701, the exchange completion data keeping device 21 determines whether or not the NG information has been received from either unit (step S2705). If the NG information has been received from either unit, the exchange completion data keeping device deletes the stored exchange completion data and the associated determination table (step S2703), and exits the process.

In a case where the NG information has not been received from either unit and there has been no response from either one of the units, the exchange completion data keeping device 21 determines whether or not a predetermined amount of time has elapsed (step S2706). If not, the exchange completion data keeping device 21 returns to step S2701. If it has elapsed, the exchange completion data keeping device 21 deletes the stored exchange completion data and the associated determination table (step S2703), and exits the process.

Thus, if a predetermined condition is met, the exchange completion data is deleted from the network, whereby it is possible to prevent the exchange completion data from being left unremoved for a long time and being misused.

Second Embodiment

The second embodiment of the present invention is directed to a system where even if one unit fails to fully receive the exchanged data from the other unit after receiving a portion thereof, the unit can obtain the remaining portion of the exchanged data. In the second embodiment, the overall system configuration is similar to that of the first embodiment, and thus FIG. 1 will be referred to in the following description of the second embodiment.

Figure 28:
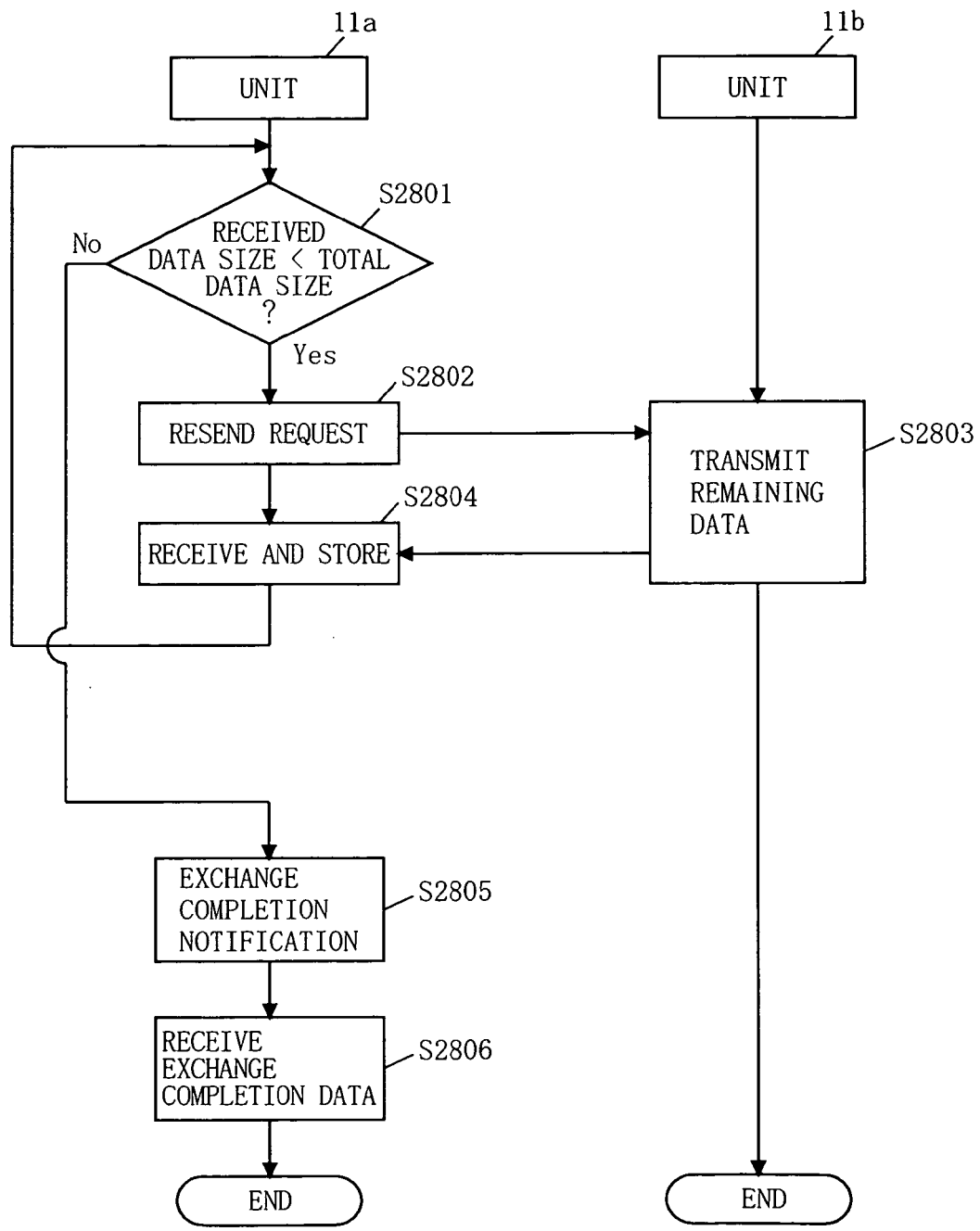
FIG. 28 is a sequence diagram illustrating an operation of the unit 11a and the unit 11b when the unit 11a requests the unit 11b to resend data to be exchanged.

FIG. 28 is a sequence diagram illustrating an operation of the unit 11a and the unit 11b when the unit 11a requests the unit 11b to resend data to be exchanged. First, when finishing the communication session with the unit 11b, the message handling section 112 of the unit 11a determines whether or not the size of the received data is smaller than the total data size previously sent from the unit 11b (step S2801).

If so, the message handling section 112 instructs the data transmission/reception section 116 to send a resend request, including the size of the already received data, to the unit 11b (step S2802). In response to this, the message handling section 112 of the unit 11b identifies the remaining data based on the size of the already received data, instructs the storage device controlling section 113 to obtain the remaining data from the data storage device 114, and instructs the data transmission/reception section 116 to transmit the remaining data to the unit 11a (step S2803). The unit 11a receives the remaining data transmitted from the unit 11b, combines the remaining data with the already received data, stores the combined data, and returns to step S2801.

If not, i.e., if the size of the received data is the same as the scheduled total size, the message handling section 112 instructs the data transmission/reception section 116 to transmit an EXCHANGE_COMPLETED message, which indicates successful data reception, to the exchange completion data keeping device 21 (step S2805), receives the exchange completion data from the exchange completion data keeping device 21 (step S2806), and exits the process. Note that if the unit 11b gives a resend request to the unit 11a, the unit 11b may operate as described above.

Thus, if a unit fails to fully receive data of interest, the unit gives a resend request to the other party's unit, whereby the unit can fully receive the data of interest.

In the above description, it is assumed that the unit 11b transmits the remaining data in response to a resend request. However, if the unit 11b is unable to be connected, the unit 11a cannot successfully receive the remaining data, in which case an exchange completion notification indicating the failure to successfully receive the data is transmitted to the exchange completion data keeping device 21.

In an embodiment where the exchange completion data is produced by the exchange completion data keeping device 21, when the unit 11b resends the exchanged data in response to a resend request from the unit 11a, the unit 11b may again obtain the conversion process data and the exchange completion data from the exchange completion data keeping device 21 to produce the converted data. In such a case, the unit 11b can send the converted data starting from the beginning thereof. Then, the unit 11a, receiving the converted data starting from the beginning thereof, can discard the already received data.

Third Embodiment

The third embodiment of the present invention is directed to a system in which the data exchange process is simplified depending on the user with which data is being exchanged. In the third embodiment, the overall system configuration is similar to that of the first embodiment, and thus FIG. 1 will be referred to in the following description of the third embodiment.

In the third embodiment, the unit 11 stores its history of data exchanges made with other units in the data storage device 114. FIG. 29 is a diagram illustrating an exemplary data structure of an exchange history stored in the unit 11. Referring to FIG. 29, the exchange history includes the unit ID of the other party's unit, the number of data exchanges that have been made with the unit, the number of successful data exchanges that have been made with the unit, the success percentage calculated based on the number of data exchanges and the number of successful data exchanges, the data reception rate from the last data exchange, and the storage location of the received data from the last data exchange (hereinafter referred to as the "last data storage location"). When exchanging data with the other unit 11, the unit 11 registers the result of the data exchange as the exchange history at the data storage device 114.

Figure 30:
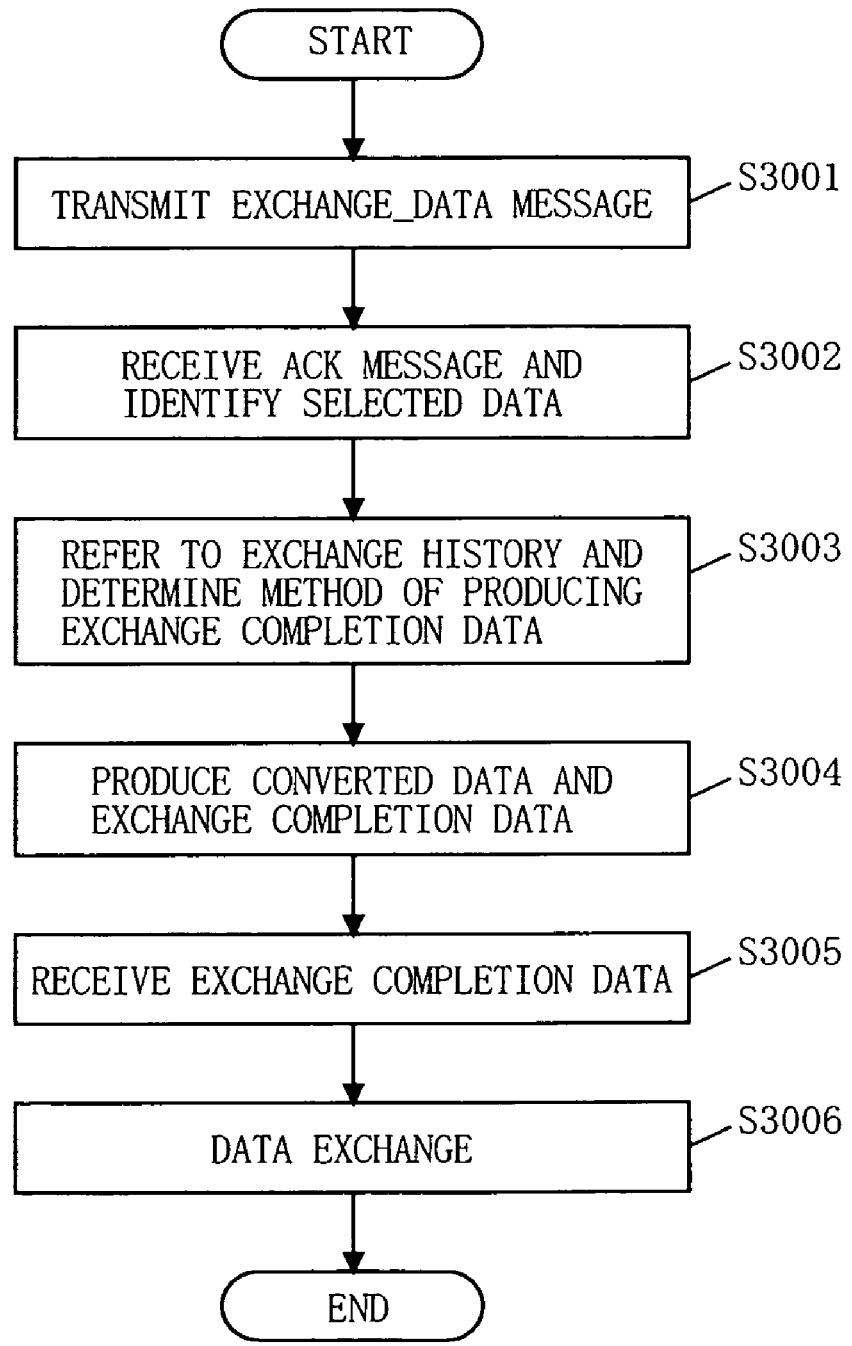
FIG. 30 is a flow chart illustrating an operation of the unit 11a when requesting the unit 11b to exchange data.

FIG. 30 is a flow chart illustrating an operation of the unit 11a when requesting the unit 11b to exchange data. First, the message handling section 112 of the unit 11a produces an EXCHANGE_DATA message addressed to the unit 11b, and instructs the data transmission/reception section 116 to transmit the produced message (step S3001). Then, the unit 11a receives an ACK message from the unit 11b, and identifies the public data thereof being selected (step S3002).

Then, referring to the exchange history, the unit 11a determines the method of producing the exchange completion data (step S3003). There are various methods of producing the exchange completion data. For example, possible methods include: if the number of exchanges is 5 or more and the success percentage is 95%, the unit 11a may transmit the requested data as it is to the unit 11b without subjecting it to a data conversion operation such as an encryption operation; if the number of exchanges is 5 or more and the success percentage is equal to or greater than 80% and less than 95%, the requested data may be encrypted with a 128-bit encryption key, while a decryption key corresponding to the encryption key is used as the exchange completion data; if the number of exchanges is 5 or more and the success percentage is less than 80%, the requested data may be encrypted with a 1024-bit encryption key, while a decryption key corresponding to the encryption key is used as the exchange completion data; and if the number of exchanges is less than 5, the requested data may be encrypted with a 512-bit encryption key, while a decryption key corresponding to the encryption key is used as the exchange completion data. Thus, by using a shorter encryption key for a higher success percentage, the operation required for the decryption process is reduced for a unit of a trusted party. For example, in the example illustrated in FIG. 29, the requested data will not be encrypted for the unit having the unit ID "C0001". The requested data will be encrypted with a 512-bit encryption key for the unit having the unit ID "C0002". The requested data will be encrypted with a 1024-bit encryption key for the unit having the unit ID "C0003". Note that the method for producing the exchange completion data is not limited to those described above.

Then, the unit 11a produces the converted data and the exchange completion data using the data production method selected in step S3003 (step S3004), transmits the produced exchange completion data to the exchange completion data keeping device 21 (step S3005), initiates the data exchange process (step S3006), and exits the process.

Thus, by producing the exchange completion data based on the history of data exchanges made with other units, it is possible to simplify the data recovery process at the other party's unit. Thus, it is possible to provide an easy-to-use system in which an exchange with a highly trusted party can be performed quickly. Moreover, a unit may simplify the conversion of data to be transmitted based on its history of data exchanges made with other units, whereby a data exchange with a highly trusted party can be performed more quickly.

The above embodiment is directed to an operation where the exchange completion data is produced within a unit. An operation where the exchange completion data is produced by the exchange completion data keeping device will now be described.

Figure 31:
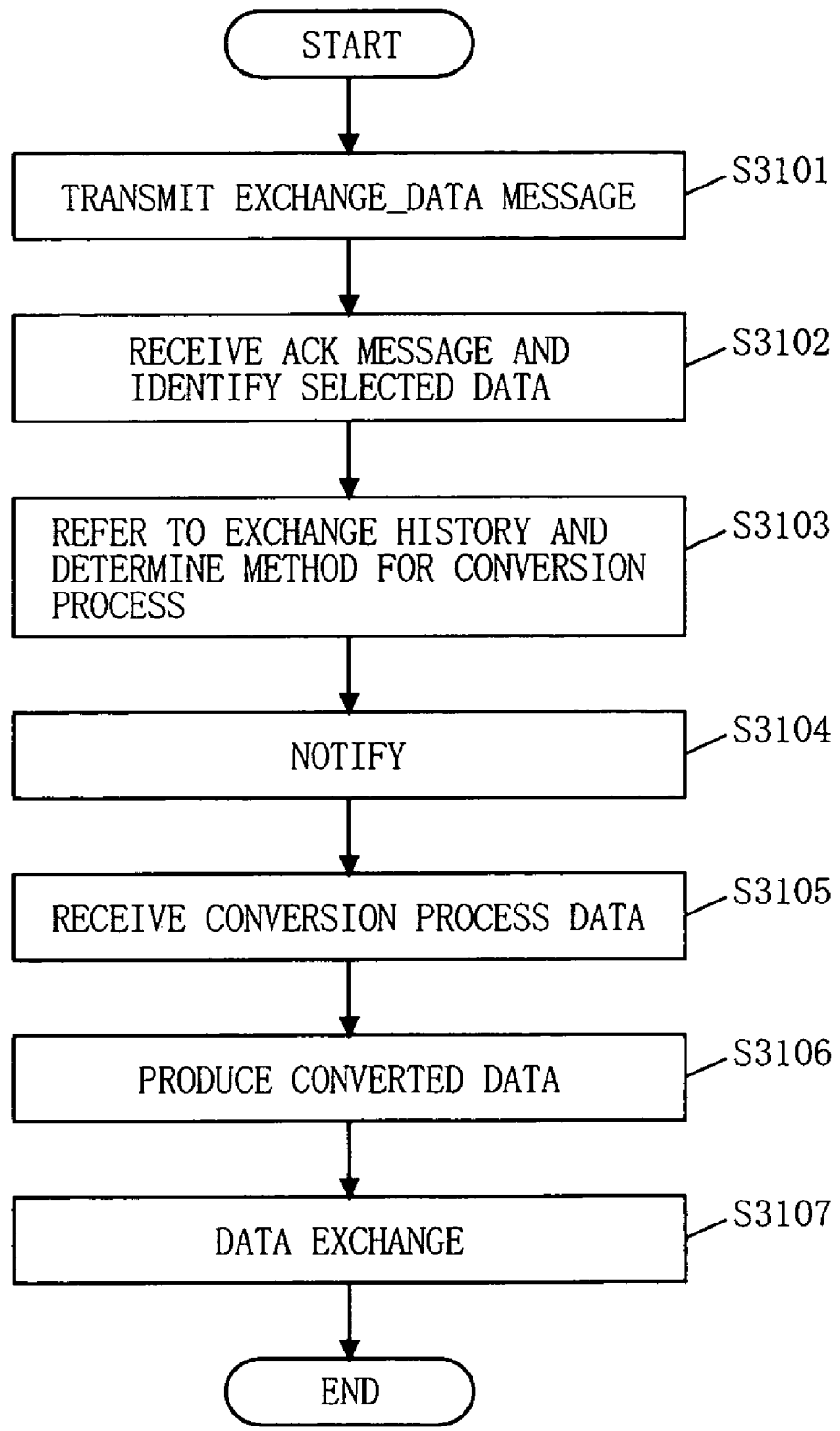
FIG. 31 is a flow chart illustrating an operation of the unit 11a when producing exchange completion data at an exchange completion data keeping device.

FIG. 31 is a flow chart illustrating an operation of the unit 11a when producing exchange completion data at the exchange completion data keeping device. First, the message handling section 112 of the unit 11a produces an EXCHANGE_DATA message addressed to the unit lib, and instructs the data transmission/reception section 116 to transmit the produced message (step S3101). Then, the unit 11a receives an ACK message from the unit 11b, and identifies the public data thereof being selected (step S3102).

Then, referring to the exchange history, the unit 11a determines the method for an exchange process to be performed at the exchange completion data keeping device 21 (step S3103). The method for an exchange process herein refers to the method used when converting data at the unit 11a. For example, in a case where a data encryption process is used as the conversion process, the unit 11a referring to the exchange history determines the length of the encryption key used in the encryption process. It is assumed that the unit 11a uses a shorter encryption key for a unit having a higher exchange success percentage.

Then, the unit 11a notifies the exchange completion data keeping device 21 of information indicating the selected method for the exchange process (step S3104). In response to the notification, the exchange completion data keeping device 21 produces the conversion process data used in the specified method for the conversion process (e.g., an encryption key), and further produces the exchange completion data corresponding to the conversion process data (e.g., a decryption key). Then, the exchange completion data keeping device 21 stores the produced exchange completion data, and transmits the exchange completion data to the unit 11a.

In response to this, the unit 11a receives the conversion process data (step S3105), produces the converted data using the conversion process data (step S3106), and initiates the data exchange with the unit 11b.

Note that the data reception rate and the last data storage location registered in the exchange history as illustrated in FIG. 29 are used when the unit 11a makes a resend request to the unit 11b after failing to successfully receive the data. It is assumed that the units previously exchange sizes of data to be transmitted to each other at the start of the data exchange process. Based on the data reception rate, the unit 11a notifies the unit 11b of the communication result indicating how much of the data has been received successfully. In response to this, the unit 11b identifies the remaining portion, which has not been transmitted successfully, and resends the remaining portion to the unit 11a. The unit 11a stores the resent data so that the data portion stored in last data storage location and the remaining data being resent will be properly joined together.

Note that the units may previously exchange hash values of data to be transmitted to each other at the start of the data exchange process. In such a case, a requesting unit can calculate the hash value of the received data to determine whether or not the data has been fully received. If the data has not been fully received, the requesting unit transmits the hash value of the received data portion to the other party's unit. In response to this, the other party's unit resends the remaining data, which can be identified based on the hash value. Thus, by using a hash value, it is possible to determine whether or not data of interest has been received even if the data size is changed along the channel.

A unit-to-unit data exchange system of the present invention, and a unit, an exchange completion data keeping device and a program for use in such a system, can prevent an unfair exchange from taking place without increasing the communications cost or the load on the server, and are useful in, for example, a system where electronic data such as information contents are exchanged.

The invention claimed is:

1. A unit-to-unit data exchange system for exchanging data between units connected to each other via a communication medium, the unit-to-unit data exchange system comprising:

a first unit including a first memory and a first processor connected to the first memory, the first unit for storing first content data of interest that can be exchanged and for encrypting the first content data of interest when the first content data of interest is exchanged;
a second unit including a second memory and a second processor connected to the second memory, the second unit for storing second content data of interest to the first unit and for encrypting the second content data of interest when the second content data of interest is exchanged to the first unit; and
an exchange completion data keeping device including a third memory and a third processor connected to the third memory, the exchange completion data keeping device being (i) connected to the first unit and the second unit via the communication medium (ii) for storing first exchange completion data that is a first decryption key, and that is necessary for reproducing encrypted second content data of interest to the first unit that is obtained by the first unit from the second unit, and (iii) for storing second exchange completion data that is a second decryption key, and that is necessary for reproducing encrypted first content data of interest to the second unit that is obtained by the second unit from the first unit,
wherein the first processor is programmed to cause the first unit to operate as:
a first exchange completion data production requesting unit for requesting the exchange completion data keeping device to produce the second exchange completion data;
a first data conversion unit for converting the first content data owned by the first unit, by using a second conversion process data transmitted from the exchange completion data keeping device, to encrypted first content data that can be reproduced successfully only by using the second exchange completion data; and
a first data recovery unit for recovering the second content data that can be reproduced successfully, from the encrypted second content data received from the second unit, by using the first exchange completion data,
wherein the second processor is programmed to cause the second unit to operate as:
a second exchange completion data production requesting unit for requesting the exchange completion data keeping device to produce the first exchange completion data;
a second data conversion unit for converting the second content data owned by the second unit, by using a first conversion process data transmitted from the exchange completion data keeping device, to encrypted second content data that can be reproduced successfully only by using the first exchange completion data; and
a second data recovery unit for recovering the first content data that can be reproduced successfully, from the encrypted first content data received from the first unit, by using the second exchange completion data,
wherein the third processor is programmed to cause the exchange completion data keeping device to receive a first communication result from the first unit when a first communication session between the first unit and the second unit is terminated, and to receive a second communication result from the second unit when a second communication session between the first unit and the second unit is terminated, and
wherein the third processor is programmed to cause the exchange completion data keeping device to operate as:
a determination unit for determining whether the first unit has successfully received from the second unit the encrypted second content data of interest to the first unit based on the first communication result, and determining whether the second unit has successfully received from the first unit the encrypted first content data of interest to the second unit based on the second communication result;
a conversion process data production/transmission unit for (i) producing the first and second conversion process data respectively used for converting the second and first content data to the encrypted second and first content data that can be reproduced successfully by using the first and second exchange completion data, and (ii) transmitting the first conversion process data to the second unit and the second conversion process data to the first unit;
an exchange completion data transmission unit for transmitting the first exchange completion data to the first unit and for transmitting the second exchange completion data to the second unit, only when the first unit has successfully received from the second unit the encrypted second content data of interest to the first unit and when the second unit has successfully received from the first unit the encrypted first content data of interest to the second unit;
an exchange completion data production unit for producing the second exchange completion data in response to the requests from the first exchange completion data production requesting unit and for producing the first exchange completion data in response to the requests from the second exchange completion data production requesting unit; and
an exchange completion data keeping unit for storing the first exchange completion data and the second exchange completion data produced by the exchange completion data production unit so that the first unit and the second unit can be respectively identified.

2. The unit-to-unit data exchange system according to claim 1, wherein:
the first conversion process data is a first encryption key;
the first exchange completion data is the first decryption key corresponding to the first encryption key;
the second exchange process data is a second encryption key; and
the second conversion completion data is the second decryption key corresponding to the second encryption key.

3. The unit-to-unit data exchange system according to claim 1, wherein:
the first processor is programmed to cause first unit to operate as a first communication result notification unit for notifying the exchange completion data keeping device of the first communication result when the first communication session is terminated;
the second processor is programmed to cause the second unit to operate as a second communication result notification unit for notifying the exchange completion data keeping device of the second communication result when the second communication session is terminated;
the third processor is programmed to cause the exchange completion data keeping device to determine whether or not the first unit has successfully received the encrypted second content data of interest to the first unit based on the first communication result from the first communication result notification unit of the first unit, and to determine whether or not the second unit has successfully received the encrypted first content data of interest to the second unit based on the second communication result from the second communication result notification unit of the second unit.

4. The unit-to-unit data exchange system according to claim 3, wherein:
the first communication result indicates whether or not the encrypted second content data of interest to the first unit has been received successfully at the first unit;
the second communication result indicates whether or not the encrypted first content data of interest to the second unit has been received successfully at the second unit; and
the third processor is programmed to cause the exchange completion data keeping device to transmit the first exchange completion data to the first unit and to transmit the second exchange completion data to the second unit, only when the first communication result indicates that the first unit has successfully received from the second unit the encrypted second content data of interest to the first unit and when the second communication result indicates that the second unit has successfully received from the first unit the encrypted first content data of interest to the second unit.

5. The unit-to-unit data exchange system according to claim 1,
wherein the first processor is programmed to cause the first unit to operate as a first resend requesting unit for requesting the second unit to resend the second encrypted content data of interest to the first unit if the first unit fails to fully receive the second encrypted content data of interest to the first unit from the second unit, and
wherein the second processor is programmed to cause the second unit to operate as a second resend requesting unit for requesting the first unit to resend the first encrypted content data of interest to the second unit if the second unit fails to fully receive the first encrypted content data of interest to the second unit from the first unit.

6. A unit for exchanging content data owned by the unit with content data of interest to the unit that is owned by another unit,
wherein the unit and the other unit encrypt the content data owned thereby, respectively, when the respective content data is exchanged therebetween,
wherein the unit comprises a first memory and a first processor connected to the first memory, the first processor being programmed to cause the unit to operate as:
an exchange history storing unit for storing a history of data exchanges made with other units;
an exchange completion data production unit for producing first exchange completion data that is a decryption key, and that is necessary for reproducing encrypted first content data that is obtained by encrypting first content data owned by the unit, by changing an exchange completion data production method based on the history of data exchanges;
an exchange completion data registration unit for registering the first exchange completion data produced by the exchange completion data production unit at an exchange completion data keeping device, the exchange completion data keeping device storing the first exchange completion data;
an exchange completion data obtaining unit for obtaining, from the exchange completion data keeping device, second exchange completion data that is a decryption key, and that is necessary for reproducing encrypted second content data obtained from the other unit when a communication session with the other unit is terminated;
a data conversion unit for converting first content data of interest to the other unit that is owned by the unit, to the encrypted first content data that is of interest to the other unit and that can be reproduced successfully only by using the first exchange completion data, by changing a data conversion method based on the history of data exchanges; and
a data recovery unit for recovering second content data of the unit that can be reproduced successfully, from the encrypted second content data that is of interest to the unit and that is received from the other unit, by using the second exchange completion data obtained by the exchange completion data obtaining unit, and
wherein the exchange completion data keeping device comprises a second memory and a second processor connected to the second memory and is connected to the unit and the other unit via a communication medium, the second processor being programmed to cause the exchange completion data keeping device to transmit (i) the first exchange completion data to the other unit, and (ii) the second exchange completion data to the unit, the transmission of the first and second exchange completion data being performed only when the unit has successfully received the encrypted second content data of interest and when the other unit has successfully received the encrypted first content data of interest.

7. The unit according to claim 6, wherein the first processor is programmed to cause the unit to operate as a resend requesting unit for requesting the other unit to resend encrypted content data of interest to the unit if the unit fails to fully receive the encrypted content data of interest to the unit.

8. A unit for exchanging content data owned by the unit with content data of interest to the unit that is owned by another unit,
wherein the unit and the other unit encrypt the content data owned thereby, respectively, when the respective content data is exchanged therebetween,
wherein the unit comprises a first memory and a first processor connected to the first memory, the first processor being programmed to cause the unit to operate as:
an exchange completion data production requesting unit for requesting an exchange completion data keeping device to produce first exchange completion data that is a decryption key, and that is necessary for reproducing encrypted first content data obtained by encrypting first content data owned by the unit, the exchange completion data keeping device storing the first exchange completion data;
an exchange completion data obtaining unit for obtaining, from the exchange completion data keeping device, second exchange completion data that is a decryption key, and that is necessary for reproducing encrypted second content data obtained from the other unit when a communication session with the other unit is terminated;
an exchange history storing unit for storing a history of data exchanges made with other units;
a conversion method notification unit for notifying the exchange completion data keeping device of a conversion method used for converting the first content data owned by the unit based on the stored history of data exchanges;

a conversion process data reception unit for receiving conversion process data, the conversion process data being used for converting the first content data that is of interest to the other unit and that is owned by the unit so that the encrypted first content data that is of interest to the other unit to be transmitted to the other unit can be reproduced successfully by using the first exchange completion data requested from the exchange completion data keeping device;

a data conversion unit for converting the first content data of interest to the other unit that is owned by the unit by using the conversion process data received by the conversion process data reception unit; and a data recovery unit for recovering the second content data that is of interest to the unit and that can be reproduced successfully, from the encrypted second content data that is of interest to the unit and that is obtained from the other unit, by using the second exchange completion data obtained by the exchange completion data obtaining unit, wherein the exchange completion data keeping device comprises a second memory and a second processor connected to the second memory, and is connected to the unit and the other unit via a communication medium, the second processor being programmed to cause the exchange completion data keeping device to:

produce the conversion process data based on the conversion method notified by the unit;

produce the first exchange completion data in response to the request to produce the first exchange completion data by the unit, and the second exchange completion data in response to a request by the other unit; and transmit (i) the first exchange completion data to the other unit, and (ii) the second exchange completion data to the unit, the transmission of the first and second exchange completion being performed only when the unit has successfully received the encrypted second content data of interest and when the other unit has successfully received the encrypted first content data of interest, and wherein the first processor is programmed to cause the unit, as the data conversion unit, to convert the first content data of interest to the other unit that is owned by the unit by using the conversion process data and using the conversion method notified to the exchange completion data keeping device.

9. The unit according to claim 8, wherein the first processor is programmed to cause the unit to operate as a resend requesting unit for requesting the other unit to resend encrypted content data of interest to the unit if the unit fails to fully receive the encrypted content data of interest to unit.

10. An exchange completion data keeping device used in a system for exchanging content data between a first unit and a second unit connected to each other via a communication medium, wherein the first unit includes a first memory and a first processor connected to the first memory, the first processor being programmed to cause the first unit to store first content data of interest to the second unit and to encrypt the first content data of interest to the second unit, wherein the second unit includes a second memory and a second processor connected to the second memory, the second processor being programmed to cause the second unit to store second content data of interest to the first unit and to encrypt the second content data of interest to the first unit, wherein the exchange completion data keeping device is connected to the first unit and the second unit via the communication medium, wherein the exchange completion data keeping device comprises:

a third memory; and a third processor connected to the third memory, and wherein the third processor is programmed to cause the exchange completion data keeping device to operate as:

an exchange completion data production unit for producing (i) first exchange completion data, in response to requests from the second unit, that is a first decryption key and that is necessary for reproducing encrypted second content data of interest to the first unit that is obtained by the first unit from the second unit and (ii) second exchange completion data, in response to requests from the first unit, that is a second decryption key and that is necessary for reproducing encrypted first content data of interest to the second unit that is obtained by the second unit from the first unit;

an exchange completion data keeping unit for storing the first exchange completion data and the second exchange completion data;

a conversion process data production/transmission unit for (i) producing first and second conversion process data respectively used for converting the second and first content data to the encrypted second and first content data that can be reproduced successfully by using the first and second exchange completion data, and (ii) transmitting the first conversion process data to the second unit and the second conversion process data to the first unit;

a data reception unit for receiving a first communication result from the first unit when a first communication session between the first unit and the second unit is terminated, and receives a second communication result from the second unit when a second communication session between the first unit and the second unit is terminated;

a determination unit for determining whether the first unit has successfully received from the second unit the encrypted second content data of interest to the first unit based on the first communication result, and determines whether the second unit has successfully received from the first unit the encrypted first content data of interest to the second unit based on the second communication result; and an exchange completion data transmission unit for transmitting (i) the first exchange completion data to the first unit and (ii) the second exchange completion data to the second unit, only when the first unit has successfully received from the second unit the encrypted second content data of interest to the first unit and when the second unit has successfully received from the first unit the encrypted first content data of interest to the second unit.

11. The exchange completion data keeping device according to claim 10, wherein the third processor is programmed to cause the exchange completion data keeping device, as the exchange completion data keeping unit, to keep the first exchange completion data and the second exchange completion data produced by the exchange completion data production unit so that the first unit and the second unit can be identified.

12. The exchange completion data keeping device according to claim 10, wherein:
the first communication result indicates whether or not the encrypted second content data of interest to the first unit has been received successfully at the first unit;
the second communication result indicates whether or not the encrypted first content data of interest to the second unit has been received successfully at the second unit; and
the third processor is programmed to cause the exchange completion data keeping device, as the exchange completion data transmission unit, to transmit the first exchange completion data to the first unit and the second exchange completion data to the second unit, when the first communication result indicates that the encrypted second content data of interest to the first unit has been received successfully at the first unit and when second communication result indicates that the encrypted first content data of interest to the second unit has been received successfully at the second unit.

13. The exchange completion data keeping device according to claim 10, wherein the third processor is programmed to cause the exchange completion data keeping device to operate as an exchange completion data deletion unit for deleting the first exchange completion data and the second exchange completion data stored in the exchange completion data keeping device if a predetermined condition is satisfied.

14. The exchange completion data keeping device according to claim 13, wherein the predetermined condition indicates that the exchange completion data deletion unit deletes the first exchange completion data transmitted to the first unit from the exchange completion data transmission unit and the second exchange completion data transmitted to the second unit from the exchange completion data transmission unit when the first unit has successfully received the first exchange completion data and when the second unit has successfully received the second exchange completion data.

15. The exchange completion data keeping device according to claim 13, wherein the predetermined condition is a condition such that the exchange completion data deletion unit deletes the first exchange completion data registered by the first unit and the second exchange completion data registered by the second unit, if the exchange completion data deletion unit is notified from either the first unit or the second unit that the encrypted content data of interest has not been received successfully.

16. A non-transitory computer-readable recording medium having a program recorded thereon, the program for instructing a computer device to exchange first content data of interest that is owned by the computer device with second content data of interest to the computer device that is owned by another computer device, the computer device encrypting the first content data of interest owned by the computer device when the first content data of interest is exchanged between the computer device and the other computer device, the other computer device encrypting the second content data of interest owned by the other computer device when the second content data of interest is exchanged between the computer device and the other computer device, and the program causing the computer device to execute a method comprising:
instructing the computer device to request an exchange completion data keeping device for keeping exchange completion data to produce first exchange completion data that is a decryption key, and that is necessary for reproducing encrypted first content data of interest to the other computer device, the encrypted first content data being obtained by encrypting the first content data of interest that is owned by the computer device;
instructing the computer device to obtain, from the exchange completion data keeping device, second exchange completion data that is a decryption key, and that is necessary for reproducing encrypted second content data of interest to the computer device, the encrypted second content data being obtained from the other computer device when a communication session with the other computer device is terminated;
requesting the exchange completion data keeping device to produce the second exchange completion data;
receiving, from the exchange completion data keeping device, a conversion process data used for converting the first content data to the encrypted first content data that can be reproduced successfully only by using the second exchange completion data;
converting the first content data owned by the computer device, by using the conversion process data, to encrypted first content data that can be reproduced successfully only by using the second exchange completion data;
receiving the encrypted second content data from the other computer device; and
recovering the second content data that can be reproduced successfully, from the encrypted second content data by using the first exchange completion data,
wherein the exchange completion data keeping device transmits (i) the first exchange completion data to the other computer device, and (ii) the second exchange completion data to the computer device, the transmitting of the first and second exchange completion data being performed only when the computer device has successfully received from the other computer device the encrypted second content data of interest to the computer device and when the other computer device has successfully received from the computer device the encrypted first content data of interest to the other computer device.

17. A non-transitory computer-readable recording medium having a program recorded thereon, the program for instructing an exchange completion keeping device, which is used in a system for exchanging content data of interest between a first computer device and a second computer device connected to each other via a communication medium, and the program causing the exchange completion keeping device to execute a method comprising:
producing (i) first exchange completion data, in response to requests from the second computer device, that is a first decryption key and that is necessary for reproducing encrypted second content data that is of interest to the first computer device and that is obtained by the first computer device from the second computer device and (ii) second exchange completion data, in response to requests from the first computer device, that is a second decryption key and that is necessary for reproducing encrypted first content data that is of interest to the second computer device and that is obtained by the second computer device from the first computer device;
storing the first exchange completion data and the second exchange completion data;
producing first and second conversion process data respectively used for converting the second and first content data to the encrypted second and first content data that can be reproduced successfully by using the first and second exchange completion data;

transmitting the first conversion process data to the second computer device and the second conversion process data to the first computer device; and transmitting the first exchange completion data to the first computer device and transmitting the second exchange completion data to the second computer device, the transmitting of the first and second exchange completion data being performed only when the first computer device has successfully received from the second computer device the encrypted second content data of interest to the first computer device and when the second computer device has successfully received from the first computer device the encrypted first content data of interest to the second computer device.

* * * * *